United States Patent
Park et al.

(10) Patent No.: US 7,308,191 B2
(45) Date of Patent: *Dec. 11, 2007

(54) METHOD FOR TEMPORARY DELETION, SEARCH, RESTORATION, AND PERMANENT DELETION OF STREAM OBJECT AND A RECORDING MEDIUM FOR STORING ADDITIONAL INFORMATION FOR RESTORATION OF STREAM OBJECT DIVIDED BY TEMPORARY DELETION

(75) Inventors: Sung-wook Park, Seoul (KR);
Seong-jin Moon, Seoul (KR);
Young-nam Oh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

This patent is subject to a terminal disclaimer.

(21) Appl. No.: 10/853,142

(22) Filed: May 26, 2004

(65) Prior Publication Data
US 2004/0213545 A1   Oct. 28, 2004

Related U.S. Application Data

(62) Division of application No. 09/559,755, filed on Apr. 27, 2000, now Pat. No. 6,763,179.

(30) Foreign Application Priority Data

Apr. 27, 1999 (KR) .................................. 99-15098
Jun. 30, 1999 (KR) .................................. 99-26050

(51) Int. Cl.
*H04N 5/91* (2006.01)

(52) U.S. Cl. ........................................ 386/95; 386/125
(58) Field of Classification Search ................. 386/46, 386/68, 70, 95, 98, 125, 126
See application file for complete search history.

(56) References Cited

U.S. PATENT DOCUMENTS

| | | | |
|---|---|---|---|
| 5,966,495 A | 10/1999 | Takahashi et al. | |
| 6,236,663 B1 | 5/2001 | Kawakami | |
| 6,373,803 B2 | 4/2002 | Ando et al. | |
| 6,408,338 B1 | 6/2002 | Moon et al. | |
| 6,470,135 B1 | 10/2002 | Kim et al. | |
| 6,553,086 B1 | 4/2003 | Yoo et al. | |
| 6,597,860 B2 | 7/2003 | Song et al. | |
| 6,763,179 B1 * | 7/2004 | Park et al. | ..................... 386/95 |

FOREIGN PATENT DOCUMENTS

EP    0 833 337 A    4/1998

(Continued)

*Primary Examiner*—Huy T. Nguyen
(74) *Attorney, Agent, or Firm*—Stein, McEwen & Bui, LLP

(57) ABSTRACT

Methods of temporary erase, search, restoration and permanent erase of a stream object and a recording medium for storing additional information for restoration of divided stream objects. To solve the problem that full restoration cannot be guaranteed in managing and editing (temporary deleting) a content which includes a film, music, or other data, when a plurality of units are used, search information in dividing a stream object by temporary deletion is generated. Using the information structure and restoration method, stream objects divided by temporary deletion can be fully restored to their original state, and the temporarily-deleted part can be permanently deleted.

1 Claim, 26 Drawing Sheets

FOREIGN PATENT DOCUMENTS

| | | |
|---|---|---|
| EP | 0 903 744 | 3/1999 |
| EP | 0 986 062 | 3/2000 |
| EP | 1 021 048 A | 7/2000 |
| EP | 1 024 495 | 8/2000 |
| JP | 08-124362 | 5/1996 |
| JP | 09-147534 | 6/1997 |
| JP | 10-079917 | 3/1998 |
| JP | 10-269706 | 10/1998 |
| JP | 2000-508503 | 7/2000 |
| WO | WO 99/09748 | 2/1999 |
| WO | 99 38166 A | 7/1999 |
| WO | 00/14744 | 3/2000 |
| WO | 00/46803 | 8/2000 |
| WO | WO 00/46803 | 8/2000 |

* cited by examiner

FIG. 7

| | SOB_S_APAT | SOB_E_APAT | SOB_S_SOBU | MAPL_ENT_Ns | MAPL[IAPATs] | SOB_TY | SC_S_APAT | SC_E_APAT |
|---|---|---|---|---|---|---|---|---|
| BEFORE TEMPORAL DELETION, SOB | 0.8 | 4.5 | SOBU1 | 3 | [3,1,1] | | 0.8 | 4.5 |
| AFTER TEMPORAL DELETION, SOB1 | 0.8 | 1.9 | SOBU1 | 1 | [2] | | 0.8 | 1.5 |
| SOB2 | 2.1 | 3.3 | SOBU2 | 1 | [2] | TE,CT | 2.1 | 3.3 |
| SOB3 | 3.5 | 4.8 | SOBU3 | 1 | [2] | CT | 3.8 | 4.5 |

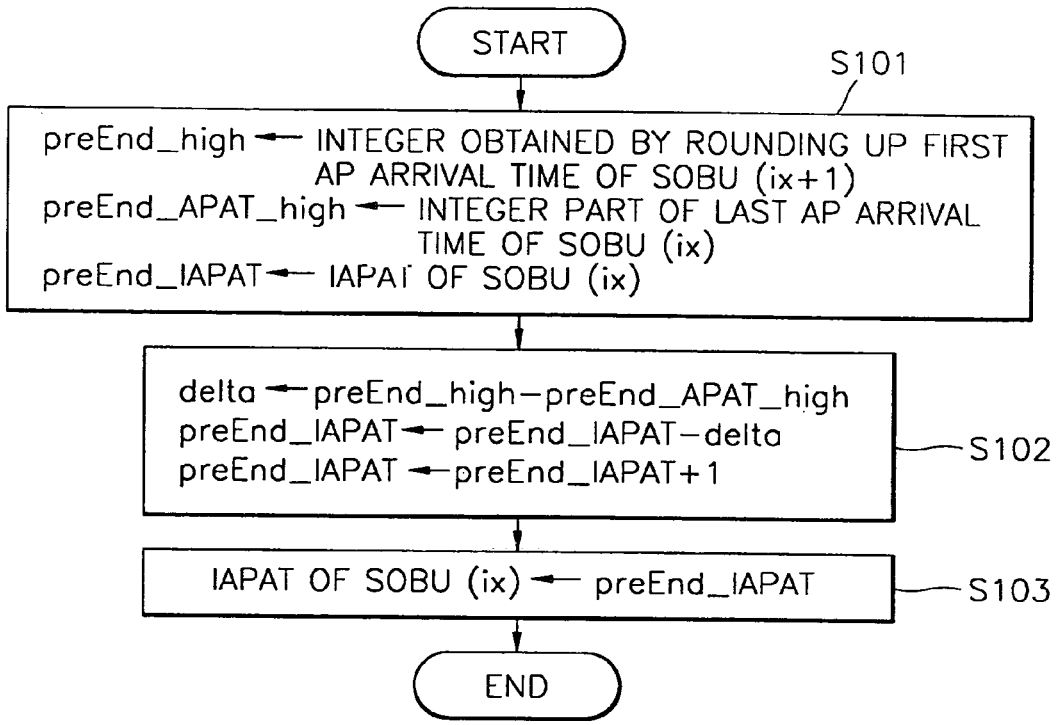
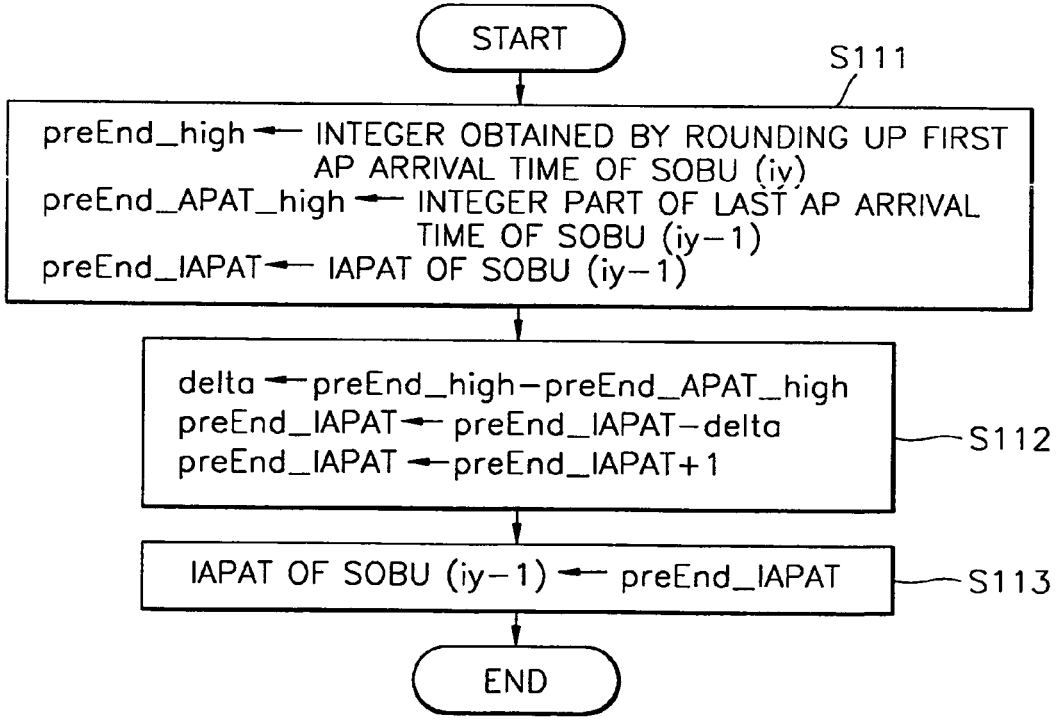

FIG. 19

| | | SOB_S_APAT | SOB_E_APAT | SOB_S_SOBU | MAPL_ENT_Ns | MAPL [IAPAT's] | SOB_TY | SC_S_APAT | SC_E_APAT |
|---|---|---|---|---|---|---|---|---|---|
| BEFORE TEMPORAL DELETION | SOB_org | 0.8 | 4.5 | SOBU1 | 3 | [3,1,1] | | 0.8 | 4.5 |
| AFTER TEMPORAL DELETION | SOB1 | 0.8 | 1.9 | SOBU1 | 1 | [2] | | 0.8 | 1.5 |
| | SOB2 | 2.1 | 3.3 | SOBU2 | 1 | [2] | TE,CT | 2.1 | 3.3 |
| | SOB3 | 3.5 | 4.5 | SOBU3 | 1 | [2] | CT | 3.8 | 4.5 |
| AFTER RESTORATION | SOB_rec | 0.8 | 4.5 | SOBU1 | 3 | [3,1,1] | | 0.8 | 4.5 |

METHOD FOR TEMPORARY DELETION, SEARCH, RESTORATION, AND PERMANENT DELETION OF STREAM OBJECT AND A RECORDING MEDIUM FOR STORING ADDITIONAL INFORMATION FOR RESTORATION OF STREAM OBJECT DIVIDED BY TEMPORARY DELETION

CROSS-REFERENCE TO RELATED APPLICATIONS

This application is a divisional application of U.S. patent application Ser. No. 09/559,755, filed on Apr. 27, 2000, now U.S. Pat. No. 6,763,179 currently pending, which claims the benefit of Korean Application Nos. 99-15098 and 99-26050 filed Apr. 27 and Jun. 30, 1999, respectively, in the Korean Patent Office, the disclosures of which are incorporated herein by reference.

BACKGROUND OF THE INVENTION

1. Field of the Invention

The present invention relates to editing and/or reproducing of packet-structured data, and more particularly, to a method of temporary deletion, search, restoration, and permanent deletion of a stream object and a recording medium for storing additional information for restoration of the stream object divided by temporary deletion.

2. Description of the Related Art

In general, content is formed by a stream object (SOB), and an SOB is formed by a plurality of predetermined stream object units (SOBUs) and managed in each SOBU unit. At this time, the stream object can be, for example, data which are recorded while a user records something from the beginning to the end. More particularly, an episode of a miniseries or a film can be recorded in one stream object. Since a program can be used instead of content, the word "program" will be used for explanation, hereinafter.

FIG. 1 illustrates an example of the relationship between data and search information used in reading wanted data in an already-recorded stream object. When a user records a program, just one program can be recognized to the user's eyes, but a cell, which provides a meaningful search tool to the user, and stream object information (SOBI), which links information in a cell to actual data, exist internally.

Particularly as for a stream object, in order to improve the physical properties of recording media and the performance and/or management-easiness and efficiency of reproducing/editing devices, data are grouped in a predetermined unit (stream object unit, SOBU) for management, and information used in accessing an SOBU is stored in a mapping list (MAPL) of SOBI. The SOBU number begins from "1" and the MAPL can have a plurality of items. These items have information of increment application packet arrival time (IAPAT), which represents the time difference between each arrival time of first packets of two SOBUs.

In order to randomly access a program recorded in a storage device, search information on a program to be accessed is separately prepared and used, in general. As search information, information on data location in a program, program reproducing time, and program recording time are usually used. When a recorded program is a film, characteristic scenes can be used as search information. Here, a program recording time will be used as an example of search information.

Search information can have diverse formats and, generally data are grouped in a big bulk as a unit of a searching object in order to reduce the volume of search information and enable fast search. Such bulk-grouping is usually done in a layered structure. FIG. 1 illustrates an example of a three-layered structure.

When search information is made in the form of a layered structure, information on an upper layer includes information on a normal immediately-lower layer. A cell exist as an upper layer in search information which is included in a program, a stream object exists below the cell, and stream object units exist below the stream object. Each layer of search information can have diverse relationships and, here, the following is assumed.

A program has one or more cells. A cell has one stream object. A stream object has one or more stream object units. A stream object unit has one or more items of data.

FIG. 1 shows a case where Program_org is formed with Cell_org; Cell_org is formed with an SOB; the SOB is formed with SOBU1, SOBU2, and SOBU3, and each SOBU is formed with data. That is, Program_org has an information structure storing a cell, the cell has an information structure storing SOBs, and each SOB has an MAPL, the information structure storing SOBUs.

In addition, in order to show the range of a stream object which search information manages, the first data arrival time of a cell (SC_S_APAT) and the last data arrival time of the cell (SC_E_APAT) are included in cell information, and the first data arrival time of a stream object (SOB_S_APAT) and the last data arrival time of the stream object (SOB_E_APAT) are included in stream object information.

A temporary erase (TE) flag represents that the stream object is temporarily deleted. Here, temporary deletion means that after a user deletes all or some parts of a program, a chance to cancel the deletion is given to the user. Unlike this temporary erase, permanent deletion means a deletion which does not provide an opportunity for canceling the deletion.

Each item of MAPL are presented by an incremental AP arrival time which means the incremental packet arrival time of each corresponding SOBU. Here, AP is an abbreviated form of application packet, and means packet-structured data. IAPAT, the incremental packet arrival time of an SOBU is defined as follows.

Search information expressed in time units has respective precision degrees depending on application fields. As for a moving picture experts group-2 (MPEG-2) system, time is counted and used in units of 27 MHz. In FIG. 1, data is expressed in units of 0.1. In order to reduce the length of the search information MAPL, an SOB is assumed to express time in units of 1.0. When this is applied to a 48-bit register for expressing time, equal to or greater than point b18, shown in FIG. 2, means an integer part and less than point b18 indicates a decimal fraction. The location of b18, immediately upper decimal fractions, will be expressed as MTU_SHIFT.

In addition, each item of MAPL in FIG. 1 has values of 3, 1, and 1, respectively, which are based on the following definition of MAPL. As a method for determining IAPAT of each SOBU, different methods are used according to the location of an SOBU in an SOB, that is, whether or not an SOBU is the last SOBU in an SOB.

For example, when M SOBUs exist in one SOB, the accumulated value of IAPATs from the first to the i-th SOBU for i-th SOBU(i) except the last SOBU must not be greater than the first AP arrival time of SOBU(i+1) by more than 1. IAPAT is assumed to be an integer expressed in units of 1.0, and the initial value of accumulation is assumed to be "0". This is expressed in the following equation 1.

$$SOBU\_S\_APAT(i+1)\ SUM\_IAPAT(i) < SOBU\_S\_APAT(i+1)+1 \quad (1)$$

Here, SUM_IAPAT(i) represents the accumulated value of all preceding SOBU's IAPAT values, including the corresponding SOBU, that is, SOBU#i, and SOBU_S_APAT (i+1) represents the arrival time of the first AP of SOBU(i+ 1).

When M SOBUs exist, the accumulated value of IAPATs from the first to the M-th for SOBU(M), the last SOBU, must be greater than the arrival time of the last AP of SOBU(M) and must not be greater than that by 1. IAPAT is assumed to be an integer expressed in units of 1.0, and the initial value of accumulation starts from "0".

$$SOBU\_E\_APAT(M) < SUM\_IAPAT(M) < SOBU\_E\_APAT(M)+1 \quad (1)$$

Here, SUM_IAPAT(M) represents the accumulated value of all preceding IAPATs, including the corresponding SOBU, that is, SOBU#M, and SOBU_E_APAT(M) represents the arrival time of the last AP of SOBU(M).

Referring to FIG. 3, the concepts of the equations 1 and 2 will now be explained in detail.

In FIG. 3, as for SOBU1, the result of accumulation of SOBU1's IAPAT, that is, the value of SOBU1, must be equal to or greater than the arrival time of the first AP of SOBU2, and must not be greater than that by 1. That is, the result of accumulation must be equal to or greater than 1.9, and must be an integer less than 2.9, and therefore, the result must be 2. Accordingly, the IAPAT of SOBU1 is 2.

As for SOBU2, the result of accumulation of IAPATs of SOBU1 and SOBU2 must be the arrival time of the first AP of SOBU3, and must not be greater than that by 1. That is, the result of accumulation must be equal to or greater than 5.5, and must be an integer less than 6.5, and therefore, the result must be 6. Since the IAPAT of SOBU1 is 2, The IAPAT of SOBU 2 is 4.

In this way, IAPATs of the first SOBU and an SOBU located in the middle can be obtained, and because a case in FIG. 4A shows a boundary condition, it needs to be more carefully handled. When the IAPAT of SOBU2 of FIG. 4A is calculated and when the arrival time of the first AP of SOBU3 is the integer 5.0, the result of accumulation to the IAPAT of SOBU2 is not 6 but 5.

In the meantime, as for SOBU6 in FIG. 3, the result of accumulation of the integer part of the arrival time of the first AP of the SOBU6 and the IAPAT to SOBU6 must be greater than the arrival time of the last AP of SOBU6, and must not be greater than that by 1. That is, the result of accumulation must be greater than 10.8, and must be an integer less than or equal to 11.8, and therefore, it must be 11. Since the result of the accumulation of IAPAT to SOBU5 is 10, the IAPAT of SOBU6 is 1.

In this way, the IAPAT of the last SOBU in an SOB can be obtained, and because a case in FIG. 4B shows a boundary condition, it needs to be more carefully handled. When the IAPAT of SOBU(6) of FIG. 4B is calculated and when the arrival time of the last AP of SOBU(6) is an integer value of 11.0, the result of accumulation to the IAPAT of SOBU(6) is not 11 but 12.

In the meantime, when a program is temporarily deleted, this deletion is indicated by a temporary erase (TE) flag, which is promised and admitted in general. Therefore, when a part of a program is temporarily deleted, a stream object is divided into a temporarily deleted stream object and an undeleted stream object, and the TE flag is set in the temporarily deleted stream object. This is for restoring the deleted part later by changing only search information which links a user and data, without actually deleting any data.

However, a method of generating search information in dividing a stream object has not been disclosed. Also, the TE flag only indicates that the temporarily deleted part has been temporarily deleted, which inevitably makes the TE flag reset in later restoration. Reading between those cells may be performed discontinuously because of the reset process.

If a restoration method having a process for resetting the TE flag is used, the restored program will have two or more cells. This means that the original program of FIG. 1 is not restored fully because the operation between cells is not defined, though the temporarily deleted part is restored after the temporary deletion. Since from the standpoint of a user, a restoration after temporary deletion means restoration to the original state, a method of fully restoring a stream object divided due to temporary deletion becomes required.

SUMMARY OF THE INVENTION

To solve the above problems, it is an object of the present invention to provide a method of temporary deletion, using search information for restoration of an original state, in a packet-structured stream object.

It is another object to provide a method of high-speed searching, using search information, when a plurality of divided stream objects exist.

It is another object to provide a method of full restoration of stream objects which were split into a plurality of fragments during temporary deletion.

It is another object to provide a method of updating a mapping lists of stream objects, each mapping list corresponding to each boundary portion of each stream object divided by temporary deletion.

It is another object to provide a method of updating mapping lists of stream objects, each mapping list corresponding to each boundary portion of each stream object, during the restoration of the stream objects fragmented by edition to an original state.

It is another object to provide a method of permanently deleting desired parts of a stream object.

It is another object to provide a recording medium for storing additional information for restoration of stream objects which were split into a plurality of fragments during temporary deletion.

To accomplish the above and other object of the present invention, there is provided a method of temporarily deleting part of a stream object recorded in a recording medium storing search information for searching a plurality of stream objects, each of which has additional information on an arrival time of packet data and link information for linking the search information to the stream objects, the method comprising: updating the search information and the link information for one of the stream objects generated corresponding to a range to be temporarily deleted and storing first data of the additional information for indicating temporary deletion in the stream object corresponding to the temporary deletion range and second data of the additional information for indicating that the stream object including the first data additional information and a preceding one of the stream objects were one contiguous stream object before temporary deletion.

To accomplish another object of the present invention, there is also provided a method of searching a plurality of stream objects stored in a recording medium storing search information for searching a plurality of stream objects, each of which has additional information on an arrival time of packet data, and link information for linking the search-information to the stream objects, the method comprising: setting an arrival time of a location a user wants to search, and setting an integer part of the arrival time of a first packet of one of the stream objects included in the location, as an initial value of an accumulated value; generating the accumulated value by accumulating an incremental packet arrival time of the one stream object to the initial value; and repeatedly performing the generating of the accumulated value until the arrival time set for the location that the user wants to search is less than or equal to the accumulated value.

To accomplish the above object of the present invention, there is provided a method of restoring stream objects fragmented by editing in a recording medium storing search information for searching a plurality of stream objects, each of which has additional information on an arrival time of packet data, and link information for linking the search information to the stream objects, the method comprising: updating the search information and the link information to restore a plurality of stream objects generated corresponding to an editing range, to an original stream object and nullifying first data of the additional information for indicating that the corresponding stream object was edited, and second data of the additional information for indicating that the edited stream object and a preceding one of stream objects were one contiguous stream object before editing.

To accomplish the above object of the present invention, there is provided a method of updating mapping list information for stream object units corresponding to boundary of each stream object divided by temporary deletion, in a recording medium storing search information for searching a plurality of stream objects, each of which has additional information on an arrival time of packet data, and link information for linking the search information to the stream objects, the method comprising: updating an incremental packet arrival time related to a last stream object unit of a preceding one of the stream objects on the boundary of each stream object divided by the temporary deletion; and updating an incremental packet arrival time related to a first stream object unit of a following one of the stream objects on the boundary of each stream object divided by the temporary deletion.

To accomplish the above object of the present invention, there is provided a method of updating mapping list information for a stream object unit corresponding to a boundary part of each stream object when restoring stream objects fragmented by editing in a recording medium storing search information for searching a plurality of stream objects, each of which has additional information on an arrival time of packet data, and link information for linking the search information to the stream objects, the method updating the mapping list information comprising: updating an incremental packet arrival time related to a last stream object unit of a preceding stream object on the boundary of each stream object being integrated when ones of the stream objects are integrated; and updating an incremental packet arrival time related to a first stream object unit of a following stream object on the boundary of each stream object being integrated when the ones of the stream objects are integrated.

To accomplish the above object of the present invention, there is provided a method of permanently deleting a number of stream objects in a recording medium storing search information for searching a plurality of stream objects, each of which has additional information on an arrival time of packet data, and link information for linking the search information to the stream objects, the method comprising: updating the search information for one of the plurality of stream objects corresponding to a range to be permanently deleted; and updating the link information, and updating mapping list information for stream object units corresponding to a boundary of the plurality of stream objects which are not permanently deleted.

To accomplish the above object of the present invention, there is provided a recording medium comprising: search information for searching a plurality of stream objects, each of which has additional information on an arrival time of packet data, and link information for linking the search information the stream objects; first additional information indicating that a temporary deletion was performed in one of the stream objects corresponding to a temporary deletion range; and second additional information indicating that the stream object including the first additional information and a preceding one of the stream objects were one contiguous stream object before the temporary deletion.

BRIEF DESCRIPTION OF THE DRAWINGS

The above objects and advantages of the present invention will become more apparent by describing in detail preferred embodiments thereof with reference to the attached drawings in which:

FIG. 7 is a table showing search information of each divided cell;

FIGS. 10A and 10B are flowcharts showing an IAPAT modification method related to a last stream object unit (SOBU) of a preceding stream object (SOB) when dividing a stream object according to the present invention;

FIG. 19 illustrates a table showing search information related to stream objects before temporary deletion, after temporary deletion, and after complete restoration;

DESCRIPTION OF THE PREFERRED EMBODIMENTS

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
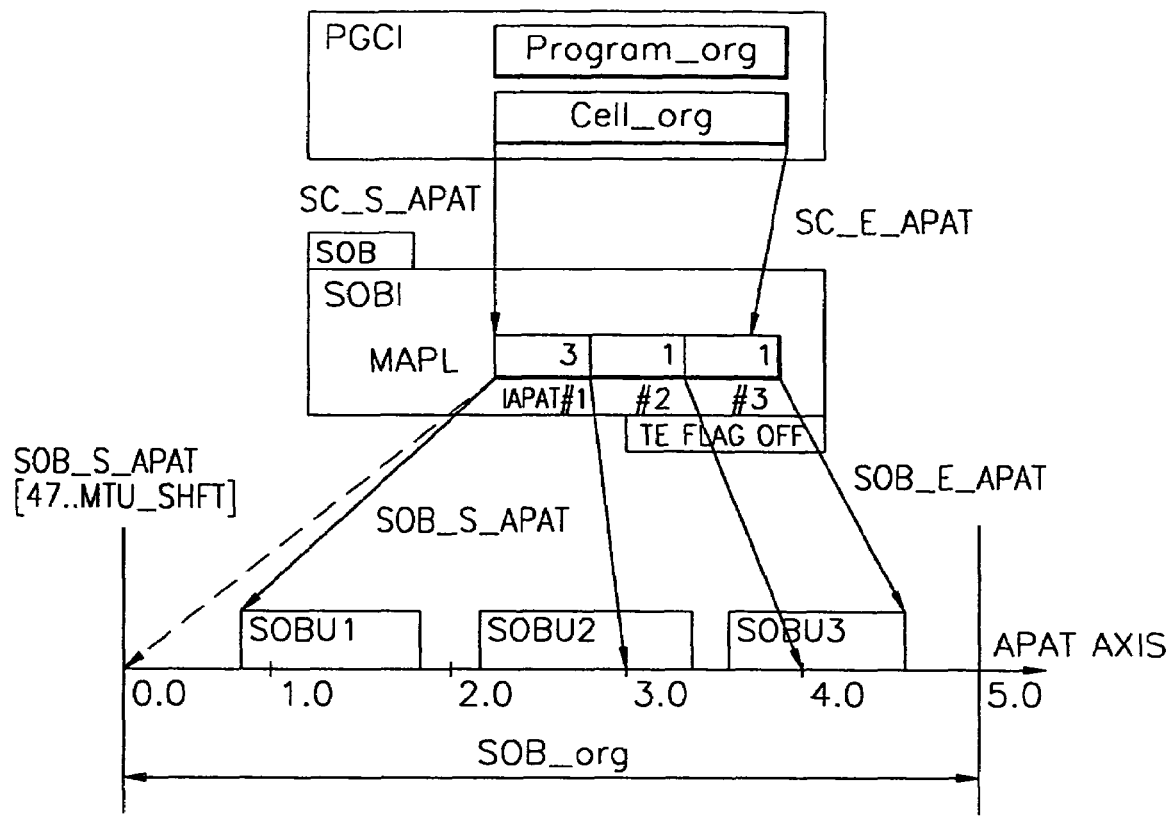
FIG. 1 illustrates an example of the relationship between data and search information used in reading a desired data portion in general.
Figure 2:
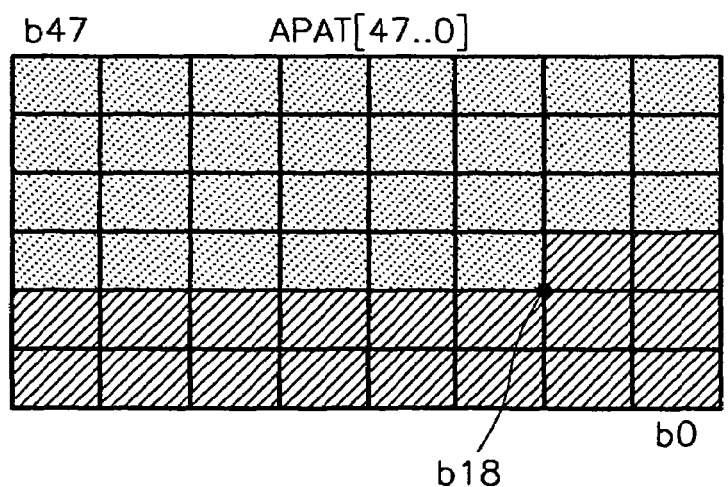
FIG. 2 illustrates areas to be used in expressing application packet arrival time (APAT) and/or incremental application packet arrival time (IAPAT) in search information shown in FIG. 1.
Figure 3:
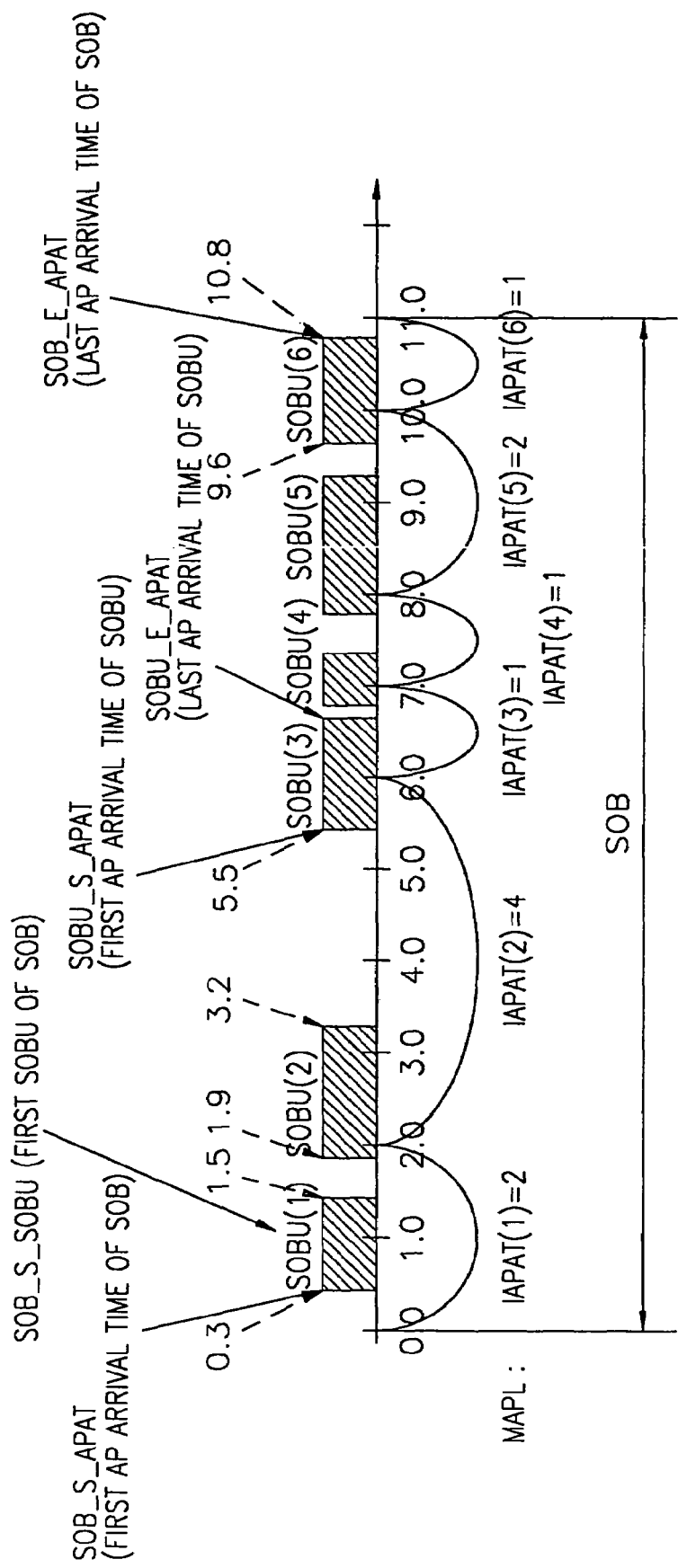
FIG. 3 illustrates a process for obtaining IAPATs in general.
Figure 4A:
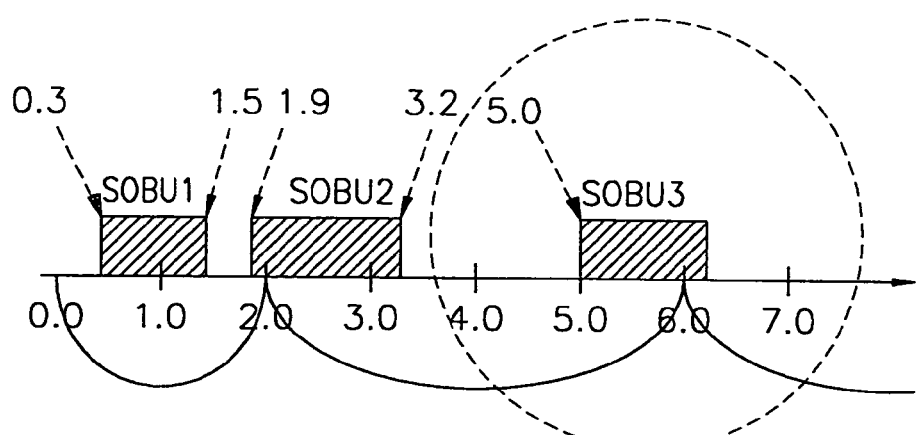
FIGS. 4A and 4B illustrate examples of obtaining IAPATs in boundary areas.
Figure 4B:
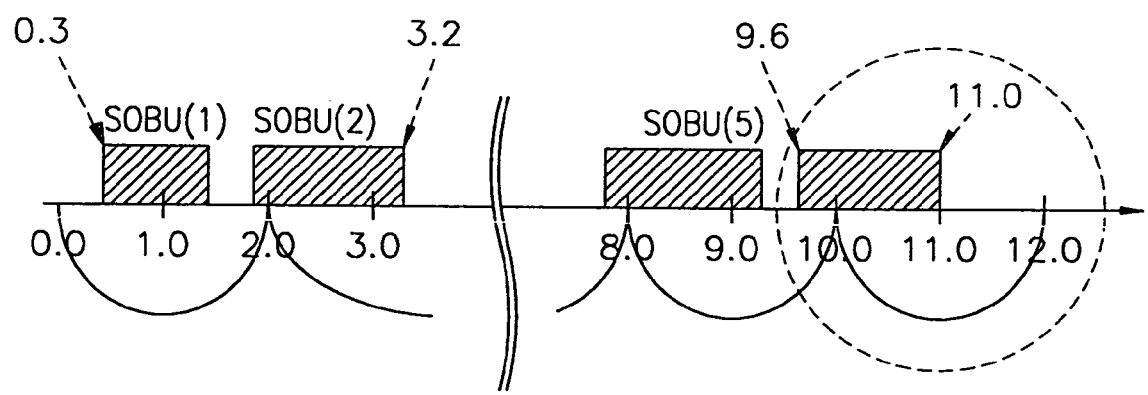
Figure 5:
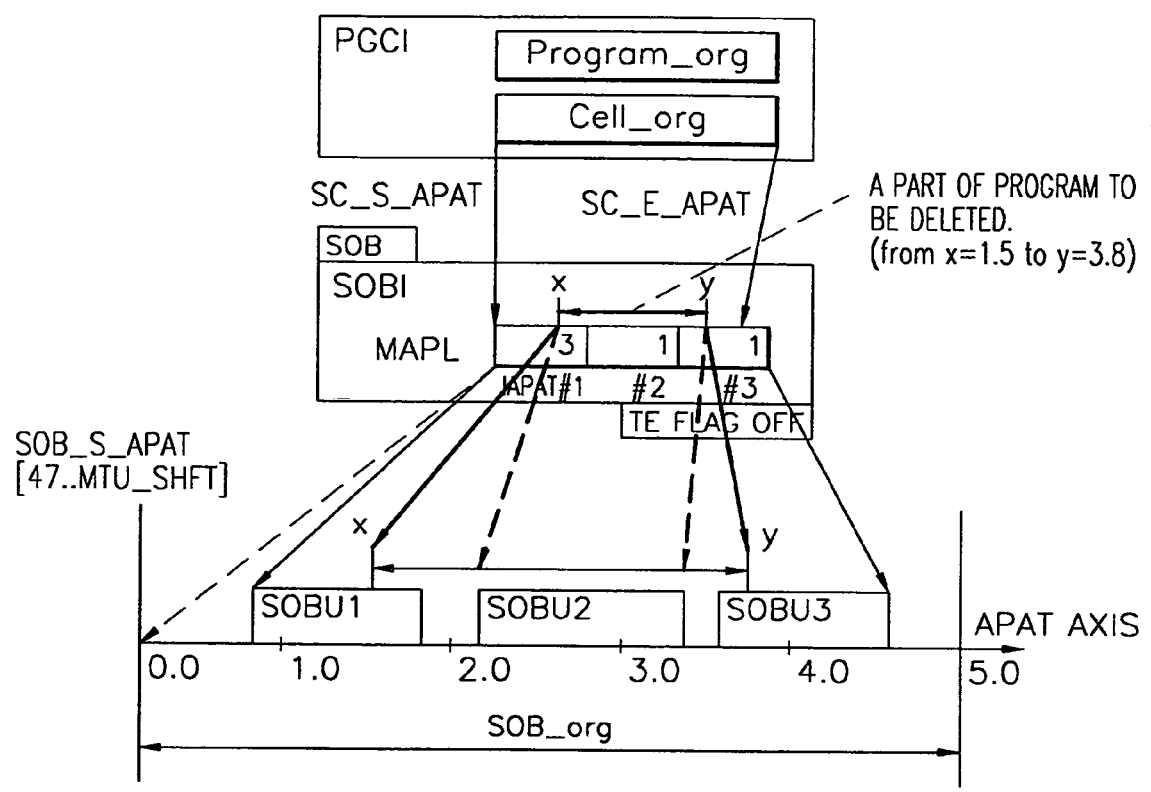
FIG. 5 illustrates an example of determining a range to be deleted during temporary deletion of part of a stream object.

FIG. 5 illustrates an example of determining a range to be deleted during temporary deletion of a part of data. From a user's standpoint, it is desirable that a stored program can be handled randomly and to a minimum unit. That is, when the user wants to temporarily delete part of a program that is a film, the user would want to edit the film by scene units. At this time, since the degree of precision with which the user wants to delete is smaller than a stream object unit (SOBU), which is a unit for an editing device to process data, the determination of a range to be deleted needs to be more carefully handled.

FIG. 5 illustrates a user's partial deletion from 1.5 to 3.8 with a degree of precision of 0.1 which is a unit less than a SOBU. Using search information, the user finds time units predetermined for temporary deletion, and based on this, one cell is divided into three cells. FIG. 5 shows that a user temporarily deletes a time block which spans x|y, the middle point of the program, and deletion of both the first part and/or the last part of the program can be included.

In order to delete from x to y, first, the SOBU to which x belongs and the SOBU to which y belongs are obtained. Referring to FIG. 5, x belongs to SOBU1 and y belongs to SOBU3. Therefore, in dividing one cell into three cells, the first cell is formed by a stream object (SOB) that includes SOBUs before SOBU1, and SOBU1, the third cell is formed by an SOB that includes SOBU3 and SOBUs after SOBU3, and the second cell is formed by an SOB that includes the remaining SOBUs. The reason is that the rule included in search information prescribes that a cell is formed by a stream object, and a stream object is formed by a plurality of SOBUs. Therefore, the first cell is formed by SOB1 that includes SOBU1, the third cell is formed by SOB3, which includes SOBU3, and the second cell is formed by SOB2, which includes SOBU2.

Figure 6:
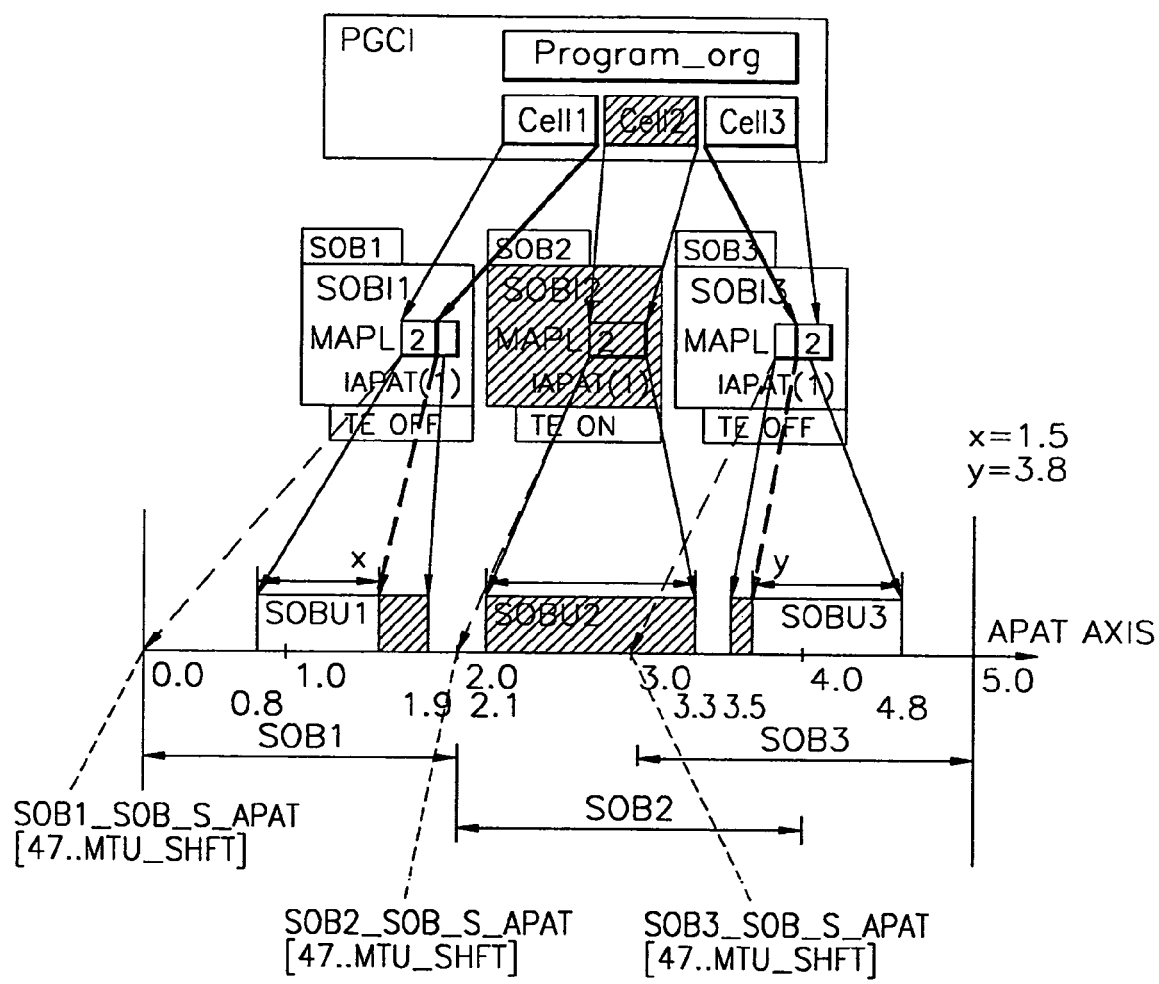
FIG. 6 illustrates an example of stream objects divided by temporary deletion.

FIG. 6 illustrates an example of stream objects divided by temporary deletion. A block from x to y marked with hatched lines is Cell 2, the block to be deleted. In order to partially delete a part of an SOB, one cell information is divided into three cell information, and then a TE flag in the middle cell, which represents temporary deletion for later restoration, is set. The reason for setting the TE flag is in case the part where the temporary deletion is done is to be restored. At this time, the first cell includes a block from the beginning of the original cell to immediately before the block to be deleted, and the last cell includes a block from immediately after the block to be deleted to the end of the original cell. SOB information (SOBI) which links cell's search information with data can have a plurality of stream object units. Here, Cell 1 represents 0.8|x(=1.5), SOB1 represents 0.8|1.9, Cell 2 represents 2.1|3.3, SOB2 represents 2.1~3.3, Cell 3 represents 3.8(=y)|4.8, and SOB3 represents 3.5|4.8.

The reason why the range of cells does not match the range of SOBIs is that an SOB records time in units of SOBU while a cell represents the time deleted by a user in the range of an SOB. By doing so, SOBI can manage an SOB in units of SOBU, and a cell can show the user whether or not a user's manipulation is handled well.

Therefore, FIG. 6 shows search information of a program which is divided into three cells through the temporary deletion process from x to y. By binding the block temporarily deleted, Cell 2 represents an information structure, cell, and sets the TE flag in order to show temporary deletion. When such search information is included, a reproducing device performs a reset process generally on the boundary of Cell 1 and Cell 3, when Cell 1 and Cell 3 are reproduced continuously. Since Cell 2 has been temporarily deleted, it is not reproduced.

In temporarily deleting the time block between x and y, one cell is divided into three cells. Search information of each divided cell are shown in a table of FIG. 7.

Application packet (AP) in the table of FIG. 7 is data used in applications having a packet structure. Incremental AP arrival time (IAPAT) represents an AP arrival time in the form which can be recognized by accumulating AP arrival time; IAPAT(i) represents the IAPAT of SOBU(i); SOB_S_APAT (the arrival time of the first AP of an SOB) represents the arrival time of the first data located in the first point in an SOB; SOB_E_APAT (the arrival time of the last AP of an SOB) represents the arrival time of the last data located in the last point in an SOB; and SOB_S_SOBU (the first SOBU of an SOB) represents the number of the first SOBU located in the first point in an SOB. MAPL_ENT_Ns (the number of MAPL items) is the number of IAPATs included in an SOB, and is the same as the number of SOBUs; MAPL [IAPATs] (MAPL item) is a set of IAPATs; SOB_TY (SOB type) is the type of SOB, and includes the TE flag, and a contiguous (CT) flag, etc.; SC_S_APAT (the arrival time of the first AP of a cell) is the arrival time of the first data located in the first point in a cell; and SC_E_APAT (the arrival time of the last AP of a cell) is the arrival time of the last data located in the last point in a cell. Here, the CT flag will be explained in FIG. 15 in detail.

The process for generating search information in temporary deletion will now be explained.

First, the SOBU number begins from 1. A value ix means the number of an SOBU which includes x. That is, SOBU (ix) refers to the SOBU which includes x. However, when x is the same as the arrival time of the first AP of an SOBU, ix is the number of an SOBU immediately before the SOBU which includes x. The value iy means the number of an SOBU which includes y. That is, SOBU(iy) refers to the SOBU which includes y. However, when y is the same as the arrival time of the last AP of an SOBU, iy is the number of an SOBU immediately after the SOBU which includes y. In FIG. 6, therefore, SOBU(ix) is SOBU1, and SOBU(iy) is SOBU3. For reference, SOBU(ix+1) is SOBU2, and SOBU (iy−1) is SOBU2.

Step 1: The arrival time of the first AP of SOB_org is copied and then used as the arrival time of the first AP of SOB1.

Step 2: The arrival time of the first AP of SOBU(ix+1) becomes the arrival time of the first AP of SOB2.

Step 3: The arrival time of the first AP of SOBU(iy) becomes the arrival time of the first AP of SOB3.

Step 4: The arrival time of the last AP of SOBU(ix) becomes the arrival time of the last AP of SOB1.

Step 5: The arrival time of the last AP of SOBU(iy−1) becomes the arrival time of the last AP of SOB2.

Step 6: The arrival time of the last AP of SOB_org is copied and used as the arrival time of the last AP of SOB3.

Figure 8:
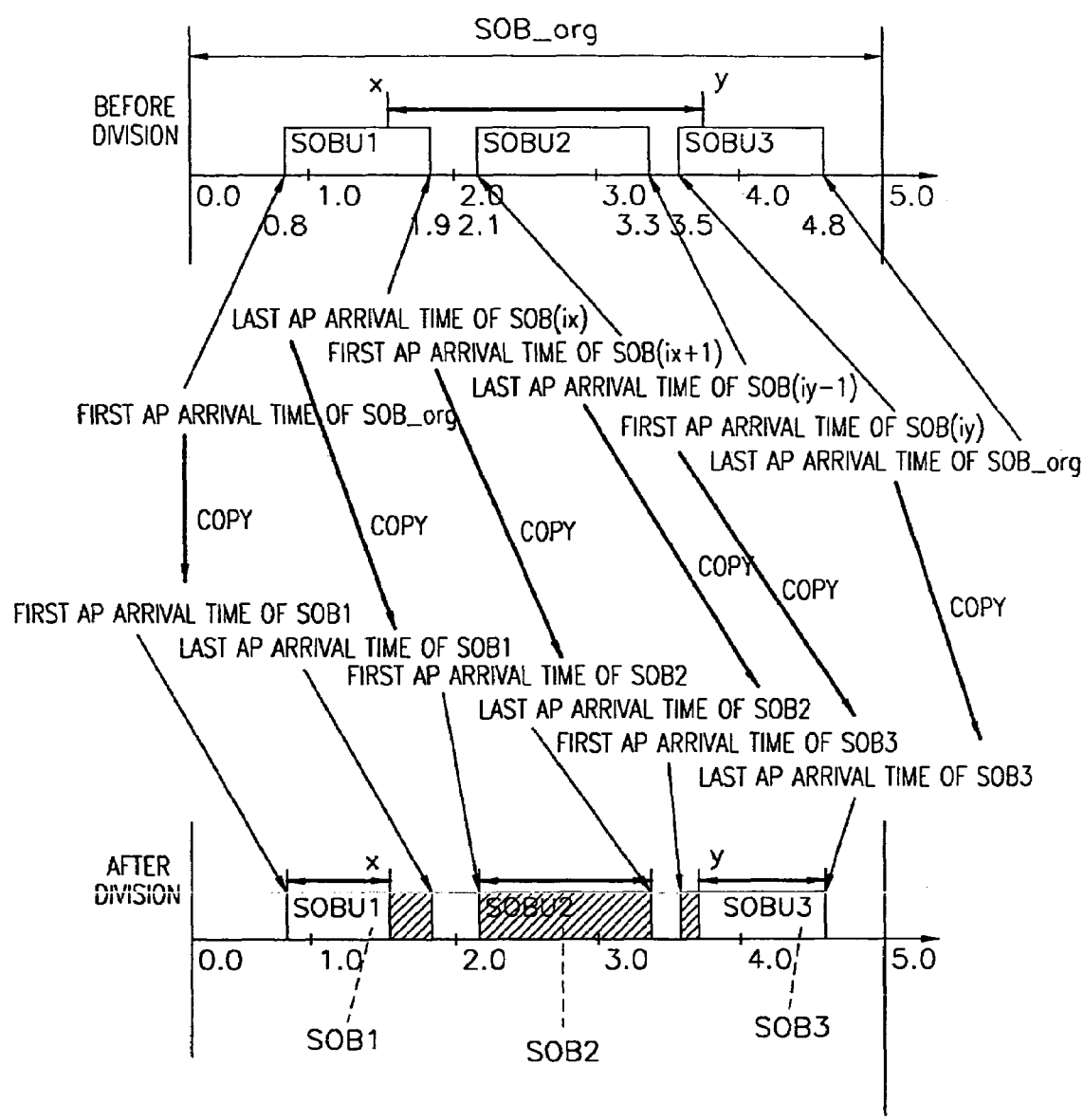
FIG. 8 illustrates changes in search information of each cell before dividing and after dividing.

Examples of the steps 1 through 6 are shown in FIG. 8.

Step 7: The first SOBU of SOB1 is set as the first SOBU of SOB_org.

Step 8: The first SOBU of SOB2 is set as SOBU(ix+1).

Step 9: The first SOBU of SOB3 is set as SOBU(iy).

When the steps 7 through 9 are applied to FIG. 6, SOB1, SOB2, and SOB3 become the respective first SOBU because each of SOB1, SOB2, and SOB3 have one SOBU. Therefore, as shown in the table of FIG. 7, the first SOBU of SOB1, SOB2, and SOB3 are SOBU1, SOBU2, and SOBU3, respectively.

Step 10: The number of MAPL items of SOB1 becomes ix.

Step 11: The number of MAPL items of SOB2 is determined as [SOBU(iy−1) number—SOBU(ix+1) number+1].

Step 12: The number of MAPL items of SOB3 is determined as [the number of MAPL of an SOB-SOBU(iy) number+1].

When the steps 10 through 12 are applied to FIG. 6, the number of MAPL items of each of SOB1, SOB2, and SOB3 becomes 1. This means that after division into three parts after temporary deletion, each of SOB1, SOB2, and SOB3 have one SOBU.

Step 13: The IAPATs of SOB1, SOB2, and SOB3 are determined. This will now be explained in relation to FIGS. 9 through 13.

When an SOB is divided, only the IAPAT value of an SOBU located on the boundary of division changes, since the rule for determining IAPAT is applied differently according to the SOBU location in an SOB.

Figure 9:
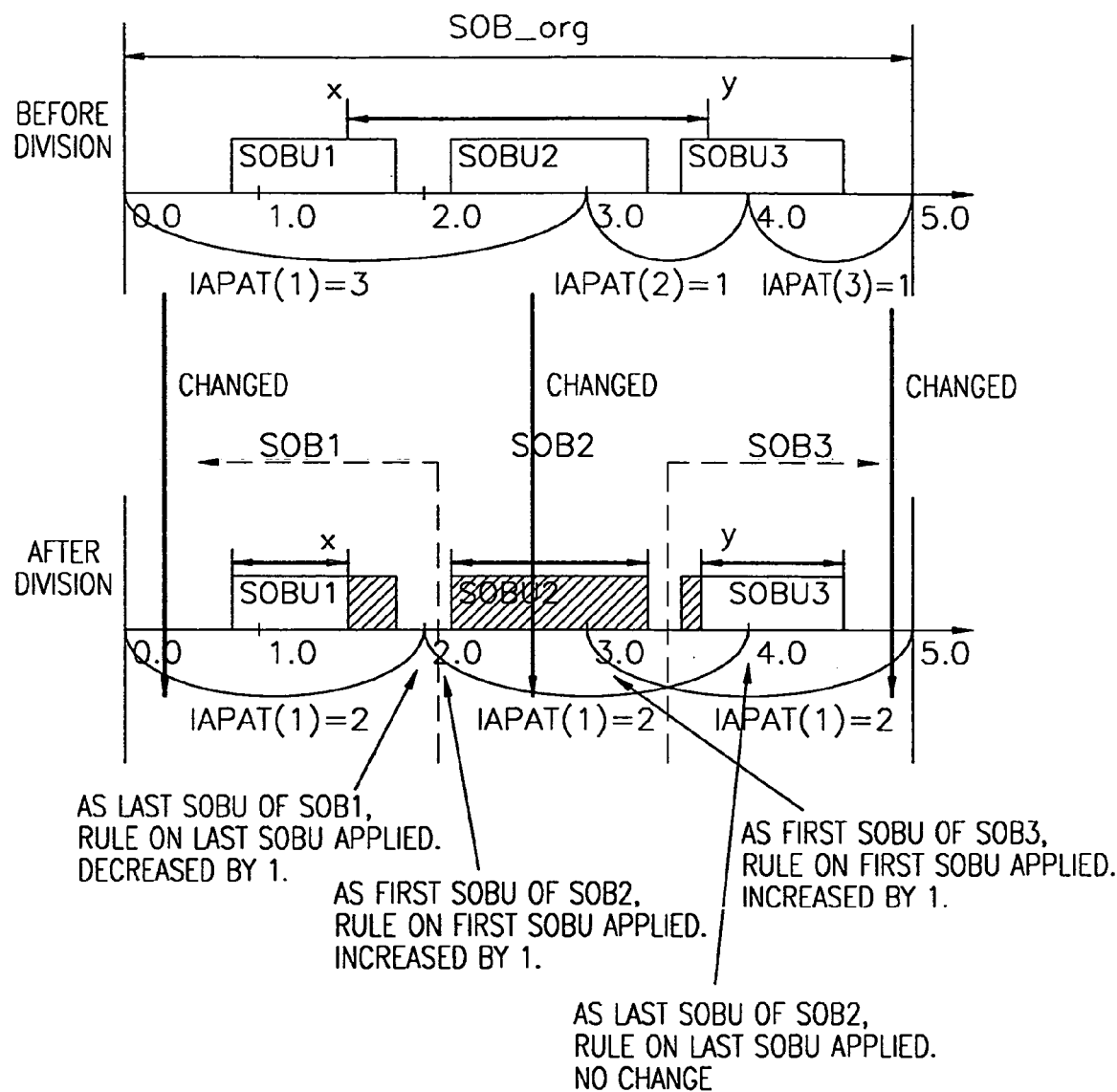
FIG. 9 illustrates changes in the IAPAT of each cell before dividing and after dividing.

In FIG. 9, the changed IAPAT after the SOB_org is divided into SOB1, SOB2, and SOB3 is shown. SOBU1 becomes the last SOBU of SOB1, and SOBU2 becomes the first SOBU of SOB2. In addition, SOBU2 becomes the last SOBU of SOB2, and SOBU3 becomes the first SOBU of SOBU3. Therefore, the IAPAT of SOBU1 becomes 2.0, being reduced by 1.0, the IAPAT of SOBU2 becomes 2.0, being increased by 1.0, and the IAPAT of SOBU3 becomes 2.0, being increased by 1.0.

This will be explained in detail in relation to the flowcharts shown in FIGS. 10A through 11B. It is assumed that the arrival time of the last AP of SOBU(ix), the arrival time of the first AP of SOBU(ix+1), the arrival time of the last AP of SOBU(iy−1) and the arrival time of the first AP of SOBU(iy) are already known.

On the boundary between SOB1 and SOB2 after dividing the SOB by temporary deletion, the relative location of both the IAPAT related to SOBU(ix=1), which is the last SOBU of SOB1, and the IAPAT related to SOBU(ix+1=2), which is the first SOBU of SOB2, changes in an SOB. Therefore, these values must be modified.

The flowchart for showing a method of modifying the IAPAT of SOBU(ix), which is the last SOBU of SOB1, is shown in FIG. 10A. First, in step S101, the arrival time of the first AP of SOBU(ix+1=2), which is the first SOBU of SOB2, is rounded up to an integer value and the integer is stored in a variable named preEnd_high (=3); the integer part of the arrival time of the last AP of SOBU(ix=1), which is the last SOBU of SOB1, is stored in a variable named preEnd_APAT_high(=1); and the IAPAT of SOBU(ix), which is the last SOBU of SOB1, is stored in a variable named preEnd_IAPAT(=3). In step S102, the difference (delta=2) between preEnd_high and preEnd_APAT_high (delta=2) is obtained, the difference is subtracted from preEnd_IAPAT(=3), and the result of the subtraction is incremented by a unit value (here, this is 1) in order to modify preEnd_IAPAT. In step S103, the modified preEnd_IAPAT (=2) is stored as the IAPAT of SOBU(ix). Therefore, the IAPAT of SOBU(ix=1) becomes 2.

Figure 11A:
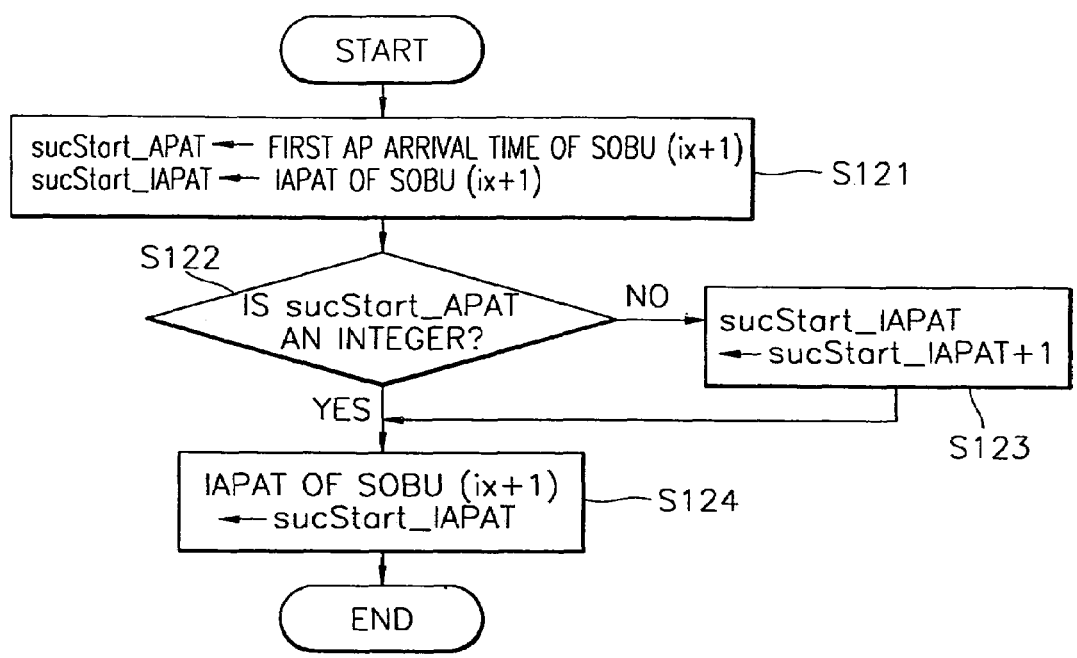
FIGS. 11A and 11B are flowcharts showing an IAPAT modification method related to a first SOBU of a following SOB when dividing a stream object according to the present invention.

Next, the method of modifying the IAPAT of SOBU(ix+1), which is the first SOBU of SOB2, is shown in FIG. 11A. First, in step S121, the arrival time of the first AP of SOBU(ix+1=2), which is the first SOBU of SOB2, is stored in a variable named sucStart_APAT(=2.1), and the IAPAT of SOBU(ix+1), which is the first SOBU of SOB2, is stored in a variable named sucStart_IAPAT(=1). It is determined whether or not sucStart_APAT is an integer in step S122, and if sucStart_APAT is not an integer, then sucStart_IAPAT is modified by being incremented by a unit value (here, this is 1) in step S123. In step S124, the modified sucStart_IAPAT (=2) is stored as the IAPAT of SOBU(ix+1). When sucStart_APAT is an integer in the step S122, sucStart_IAPAT(=1), which is set in the step S121, is stored as the IAPAT of SOBU(ix+1) without modification. Therefore, the IAPAT of SOBU(ix+1=2) becomes 2.

Figure 12:
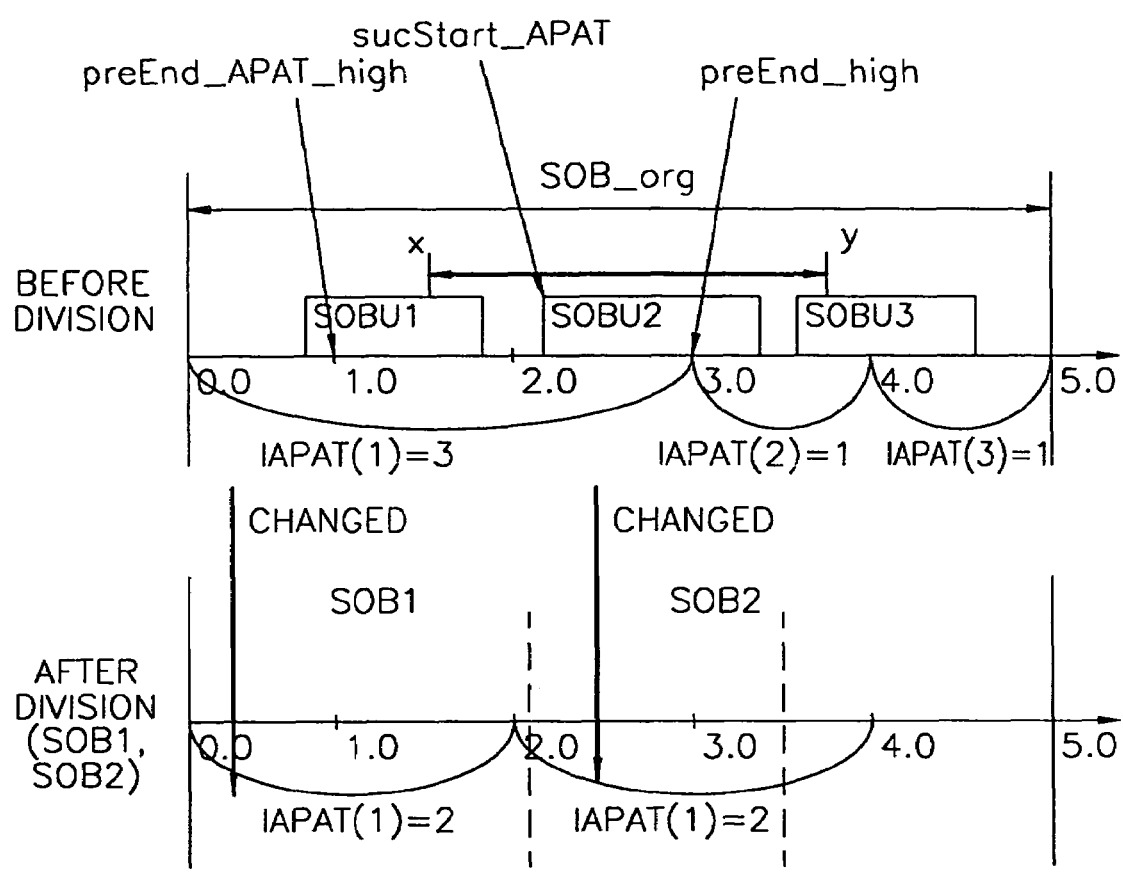
FIG. 12 illustrates values indicated by variables used in the flowcharts shown in FIGS. 10A and 11A, when the stream object is divided into SOB1 and SOB2.

FIG. 12 is a schematic diagram of the values indicated by the variables used in the flowcharts of FIGS. 10A and 11A, when a stream object is divided into SOB1 and SOB2.

Similarly, also on the boundary between SOB2 and SOB3 when dividing SOB by temporary deletion, the IAPAT related to SOBU(iy−1=2), which is the last SOBU of SOB2, and the IAPAT related to SOBU(iy=3), which is the first SOBU of SOB3, changes in relative location in an SOB. These values must be modified as described in FIGS. 10B and 11B.

The flowchart for showing a method of modifying the IAPAT of SOBU(iy−1), which is the last SOBU of SOB2, is shown in FIG. 10B. First, in step S111, the arrival time of the first AP of SOBU(iy=3), which is the first SOBU of SOB3, is rounded up to an integer value, and stored in a variable named preEnd_high (=4); the integer part of the arrival time of the last AP of SOBU(iy−1=2), which is the last SOBU of SOB2, is stored in a variable named preEnd_APAT_high (=3); and the IAPAT of SOBU(iy−1), which is the last SOBU of SOB2, is stored in a variable named preEnd_IAPT (=2). In step S112, the difference (delta=1) between preEnd_high and preEnd_APAT_high (delta=1) is obtained; the difference is subtracted from preEnd_IAPAT (=2); and the result of the subtraction is incremented by a unit value (here, this is 1) to modify preEnd_IAPAT. In step S113, the modified preEnd_IAPAT(=2) is stored as the IAPAT of SOBU(iy−1). Therefore, the IAPAT of SOBU(iy−1=2) becomes 2.

Figure 11B:
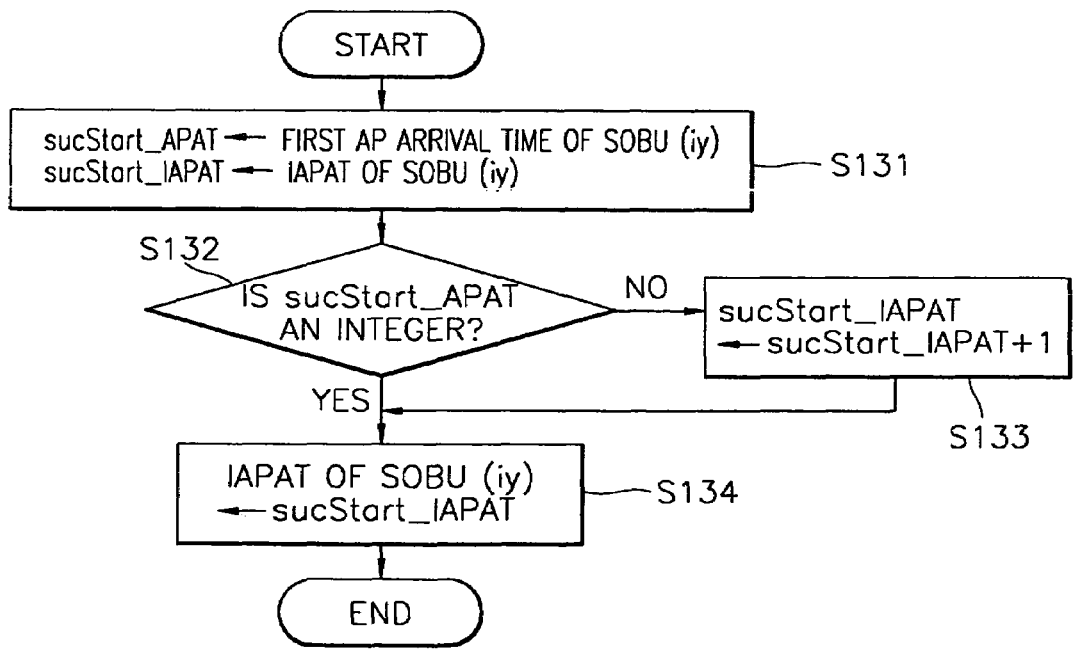

Next, the flowchart for showing a method of modifying the IAPAT of SOBU(iy), which is the first SOBU of SOB3, is shown in FIG. 11B. First, in step S131, the arrival time of the first AP of SOBU(iy=3), which is the first SOBU of SOB3, is stored in a variable named sucStart_APAT (=3.5), and the IAPAT of SOBU(iy), which is the first SOBU of SOB3 is stored in a variable named sucStart_IAPAT (=1), in step S131. It is determined in step S132 whether or not sucStart_APAT is an integer in step S132, and if sucStart_APAT is not an integer, sucStart_IAPAT(=1) is modified by being incremented by a unit value (here, this is 1) in step S133. The modified sucStart_IAPAT (=2) is stored as the IAPAT of SOBU(iy), or when sucStart_APAT is an integer in the step S132, sucStart_IAPAT (=1), which is set in the step S131, is stored as the IAPAT of SOBU(iy) without modification in step S134. Therefore, the IAPAT of SOBU (iy=3) becomes 2.

Figure 13:
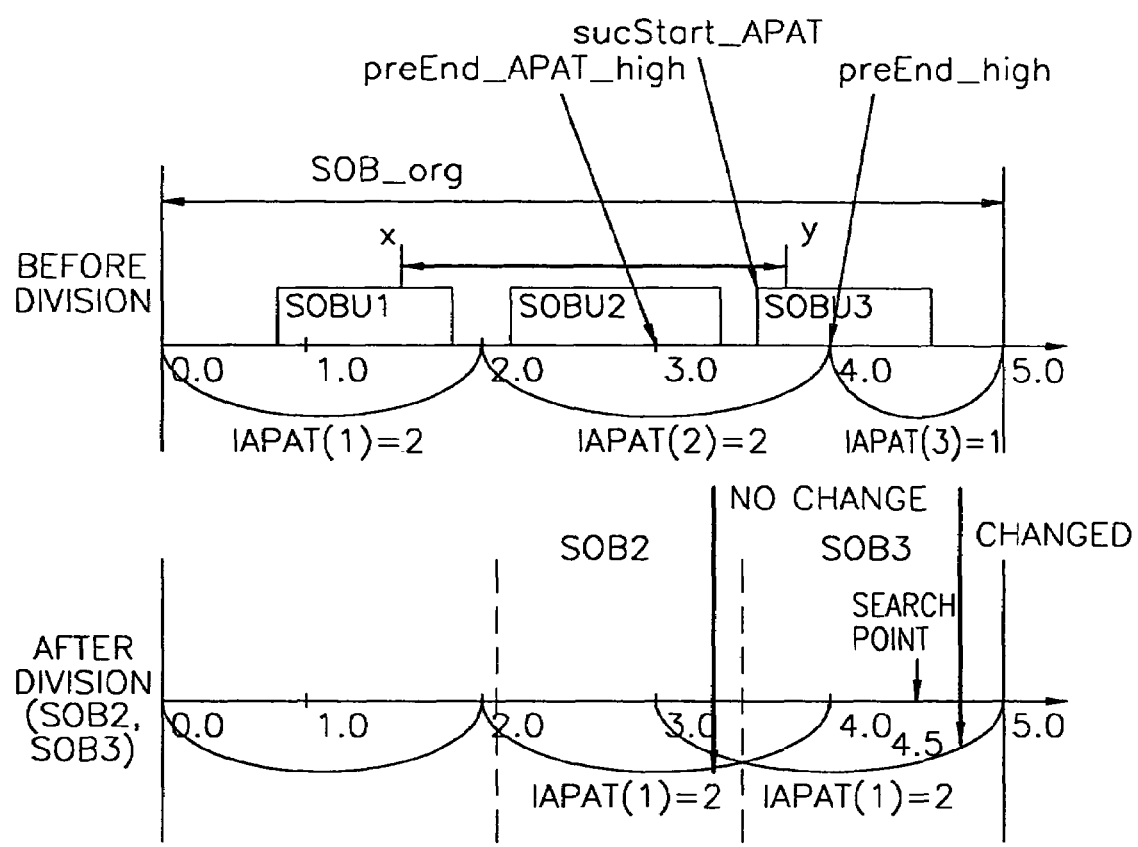
FIG. 13 illustrates the values indicated by the variables used in the flowcharts shown in FIGS. 10B and 11B, when the stream object is divided into SOB2 and SOB3.

FIG. 13 illustrates the values indicated by the variables used in the flowcharts shown in FIGS. 10B and 11B, when a stream object is divided into SOB2 and SOB3. Step 14: The TE flag and CT flag of SOB2, which are to be temporarily deleted, are set. The CT flag of SOB3, which is an SOB following the SOB2 to be temporarily deleted, is set.

Step 15: The arrival time of the first AP of a cell corresponding to SOB_org becomes the arrival time of the first AP of a cell corresponding to SOB1.

Step 16: The arrival time of the last AP of a cell corresponding to SOB1 becomes x.

Step 17: The arrival time of the first AP of a cell corresponding to SOB2 becomes the arrival time of the first AP of SOBU(ix+1).

Step 18: The arrival time of the last AP of a cell corresponding to SOB2 becomes the arrival time of the last AP of SOBU(iy−1).

Step 19: The arrival time of the first AP of a cell corresponding to SOB3 becomes y.

Step 20: The arrival time of the last AP of a cell corresponding to SOB_org becomes the arrival time of the last AP of a cell corresponding to SOB3.

The process in which an SOB is divided and SOBs are found using modified search information will now be described. Taking SOB3 as an example, expressions which can be applied to generalized cases are as follows.

For example, if data, that is an AP, which is located at 4.5 as shown in FIG. 13, is to be searched, then the following steps are performed.

Step 1: 4.5 is stored in a target variable.

Step 2: The integer part of the arrival time of the first AP of an SOB (SOB_S_APAT) is taken as the initial value of accumulation.

Step 3: 1 is stored in variable i.

Step 4: accumulation of IAPAT(i) is performed (sum=sum+IAPAT(i)).

Step 5: If the target variable is less than or equal to the accumulated value (sum), then it indicates that the target variable is included in SOBU(i). If the target variable is greater than the accumulated value (sum), i is incremented by 1 and then the step 4 is performed.

Here, in finding an SOB that includes the wanted data, setting the integer part of the arrival time of the first data of an SOB as the initial value of accumulation, instead of setting the initial value to "0", enables IAPAT to be kept at a smaller value, which is the merit of this method. If the initial value is set to "0" as in the previous methods, the IAPAT of SOB3 must be 5, which is much greater than 1 of this method. This means a memory having a greater number of bits is required in implementing a circuit.

Figure 14:
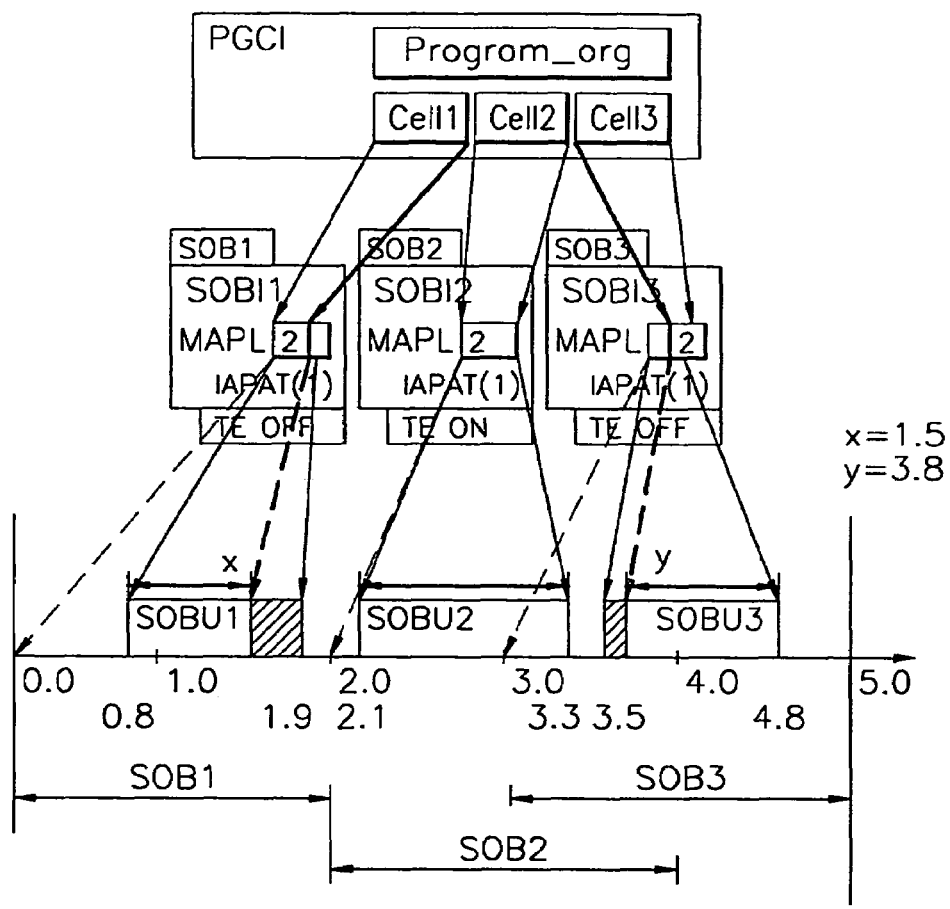
FIG. 14 illustrates an example of restoring a stream object, which is divided by temporary deletion, using a simple restoration method.

FIG. 14 illustrates an example of restoring a stream object, which is divided by temporary deletion, using a simple restoration method, and an example of restoring the part that was temporarily deleted, using search information of prior art. The simple restoration nullifies the TE flag in an SOB which cannot be shown to a user. That is, in order to indicate that a cell is temporarily deleted, the TE flag in an SOBI is reset. When this method is used, a user can read all of cell 1, cell 2, and cell 3. However, to put it more concretely, since cell 1 can read the range between 0.8 and x(=1.5), cell 2 can read the range between 2.1 and 3.3, and cell 3 can read the range between y(=3.8) and 4.8, only those ranges can be read, while the ranges marked by deviant lines cannot be read. In addition, since a program which was formed by a cell is divided into three cells by partial deletion, a definition of operations among cells are required when cells are restored. In order to solve the problem that reading among the cells is performed discontinuously because of a reset process inserted in the conventional method, the present invention provides an information structure of an SOB shown in FIG. 15.

Figure 15:
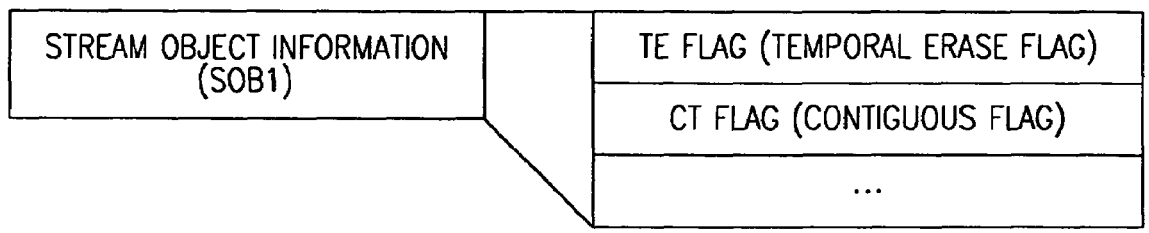
FIG. 15 illustrates an example of the structure of SOB information (SOBI) according to the present invention.

FIG. 15 illustrates an example of implementing additional information according to the present invention, in the range of SOBI. Here, the additional information is referred to as contiguous (CT) flag. The CT flag and the TE flag can be stored in cell information.

When a CT flag indicating that divided SOBs are contiguous does not exist, the divided SOBs cannot be restored to the original state. Because, by using only the conventional search information, it cannot be known whether or not the neighboring SOBs in a divided state can be integrated. Therefore, information that indicates whether or not neighboring SOBs could be contiguously reproduced before division is necessary in order to fully restore the original state.

Therefore, though the CT flag can be a separate part of search information, or can exist in any location of existing search information, the CT flag is included in an SOBI in the embodiment of the present invention. This is because temporary deletion is performed on an SOB, and the CT flag shows changes occurred in an SOB. Referring to FIG. 15, therefore, the TE flag indicates temporary deletion and the CT flag indicates that divided SOBs were one contiguous SOB before temporary deletion.

The CT flag means that the SOB related to the CT flag and the preceding SOB were one contiguous SOB before temporary deletion. This means that the SOB related to the CT flag can be integrated with the preceding SOB. Such a case frequently occurs when dividing an SOB by partial deletion. Also, it is possible to have a CT flag indicating that a current SOB was contiguous with the following SOB. Of course, both a CT flag indicating that a current SOB was contiguous with the preceding SOB and a CT flag indicating that a current SOB was contiguous with the following SOB can be included in one SOBI. This structure has merit that information can be gathered and managed in one place, but it is more unusual than a structure in which only information on the preceding SOB is included, and management thereof is inconvenient. Therefore, the structure in which only one CT flag exists in an SOB will be explained here, and more particularly, when the CT flag indicates that the current SOB was contiguous with the preceding SOB.

Figure 16:
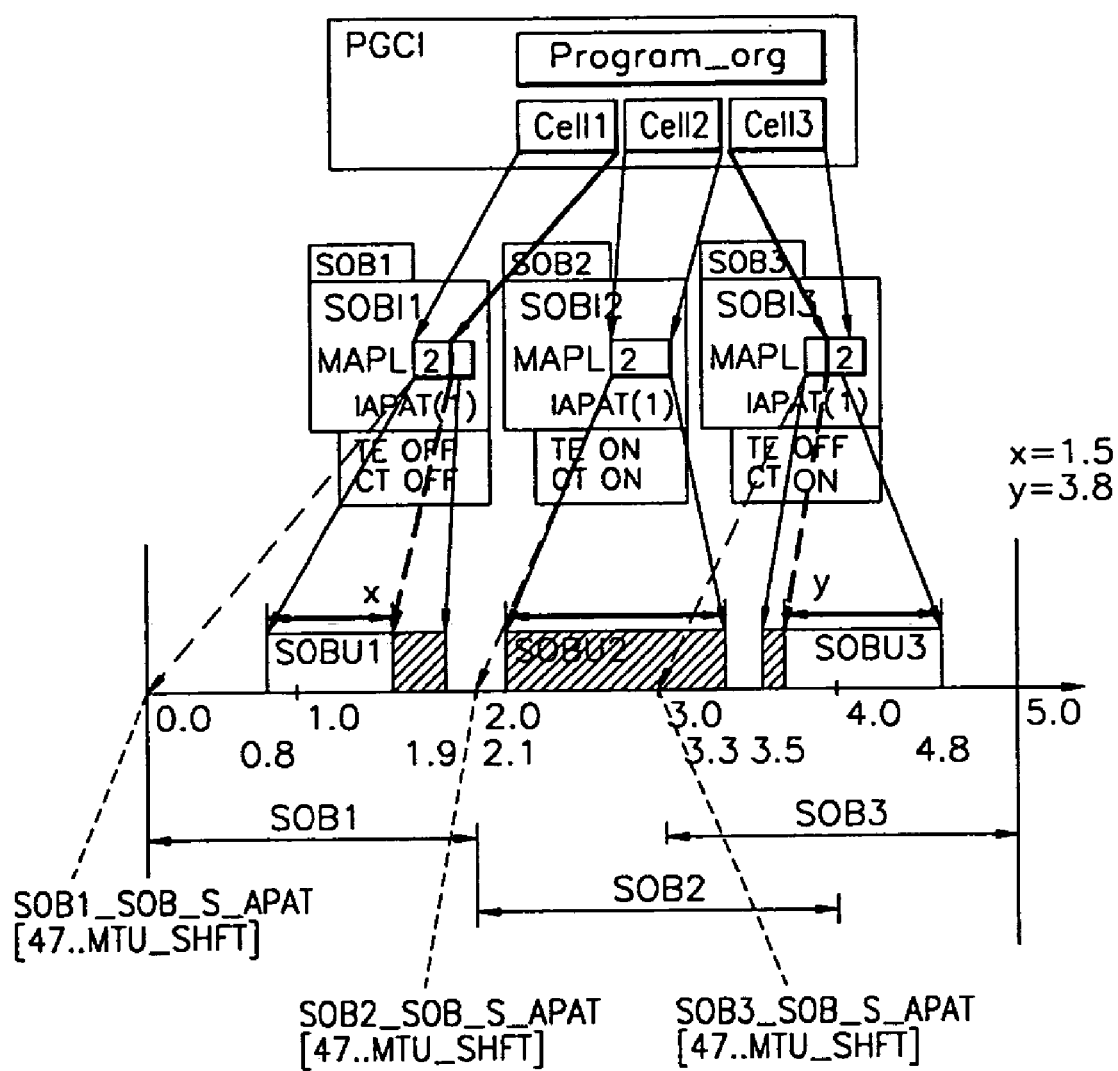
FIG. 16 illustrates an embodiment of dividing a stream object using the SOBI information shown in FIG. 15.

FIG. 16 illustrates an example of adding the SOBI of FIG. 15 to divided SOBs. Unlike the example of FIG. 6, a CT flag is added to each SOBI for an SOB divided by temporary deletion in the present invention. Since SOB2 of Cell2 represents the temporarily deleted part, the TE flag is set in SOBI2. In addition, since the preceding SOB1 and SOB2 were one contiguous SOB before temporary deletion, the CT flag is also set in SOBI2. Since SOB2 and SOB3 were one contiguous SOB before partial deletion, the CT flag is set in SOBI3, which related to SOB3. Because SOB3 was not temporarily deleted, the TE flag is not set in SOBI3.

Figure 17:
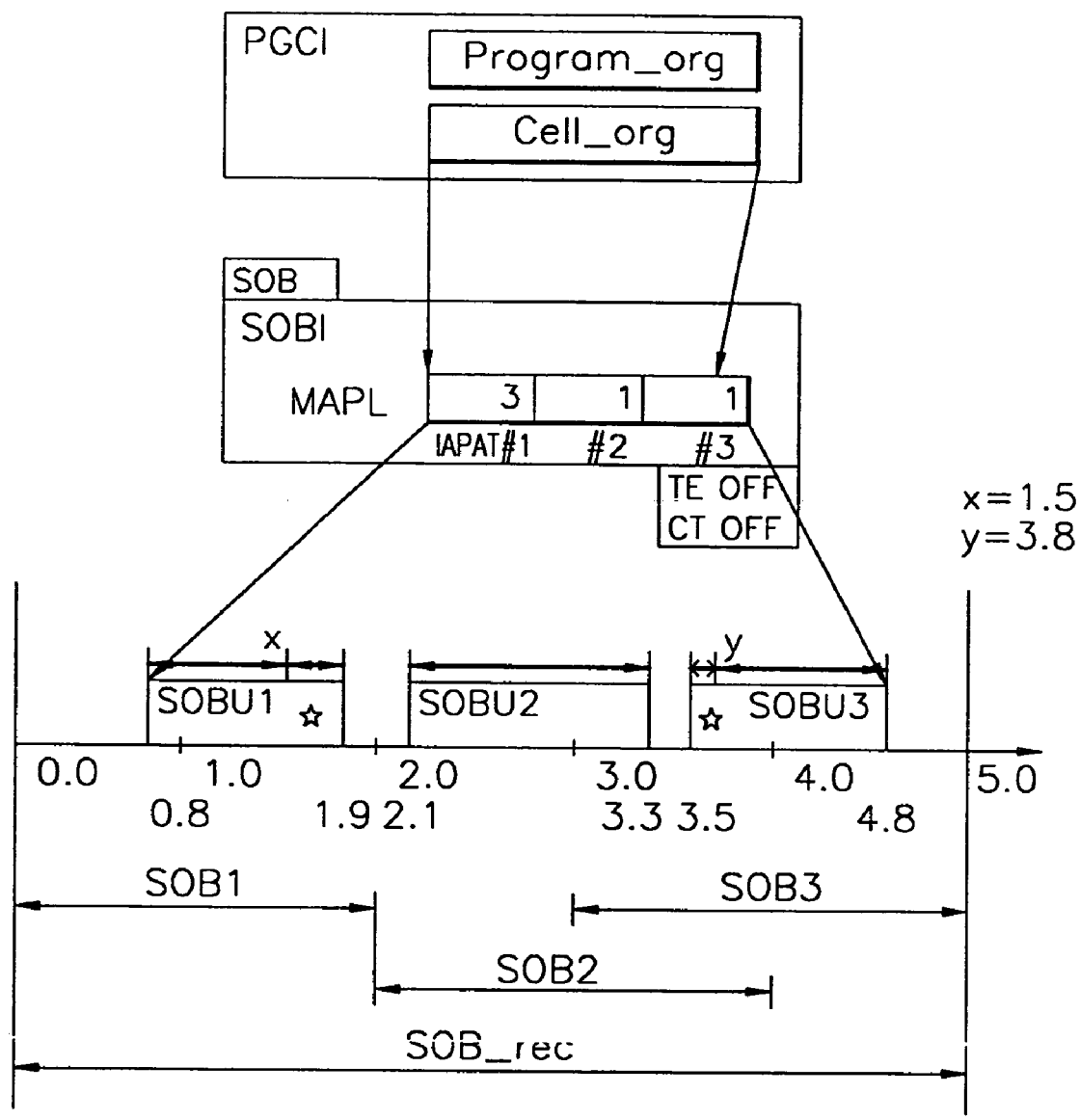
FIG. 17 illustrates an example of restoring a stream object, using the SOBI information shown in FIG. 15.

FIG. 17 illustrates an example of restoring divided SOBs shown in FIG. 16, using the CT flag according to the present invention. FIG. 17 shows that the ranges from x to 1.9 and from 3.5 to y, marked by *, which cannot be restored by the previous art of FIG. 14, can be fully restored.

The restoration process according to the present invention will now be explained.

Step 1: SOBs to be the object of an integration process carried out in a full restoration process is determined.

Here, for explanation, a cell which is temporarily deleted and to be restored is referred to as a target cell, and an SOB corresponding to the target cell is referred to as a target SOB. In FIG. 16, a target cell is Cell 2, and the target SOB is SOB2.

Figure 18:
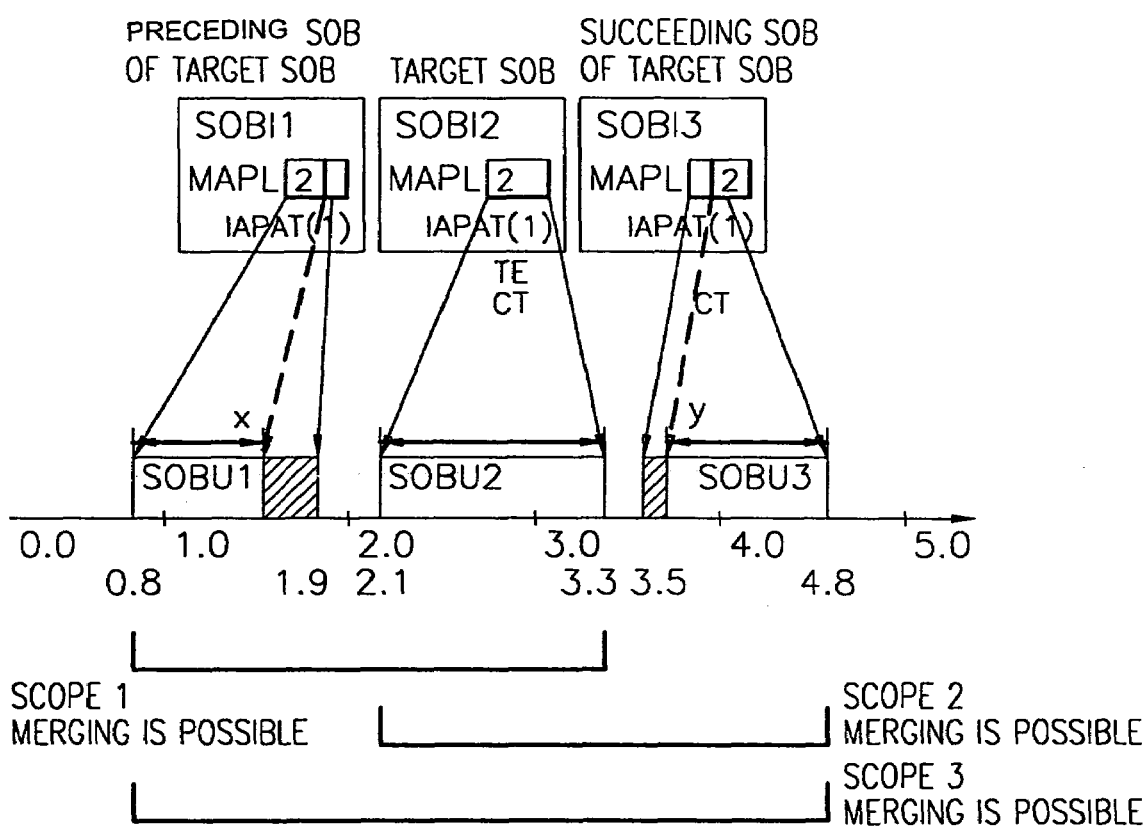
FIG. 18 illustrates an example of a range to which the restoration process according to the present invention is applied.

To begin a full restoration process, first, SOBs to be integrated are determined. This process can be done, using the TE flag and the CT flag, and the range where the restoration process is applied is shown in FIG. 18. Full restoration begins from the target SOB. When the TE flag and the CT flag of the target SOB are set, the TE flag of the preceding SOB must be in a reset state, which means that the preceding SOB must be in a normal state.

When the normal state of flags of the two SOBs are confirmed, the SOBs can be integrated. In addition, when the CT flag is set and the TE flag is reset in the following SOB of the target SOB, the two SOBs can be integrated. In conclusion, it can be inferred that all of the preceding SOB, the target SOB, and the following SOB can be integrated. When the program shown in FIG. 16 is fully restored, all of SOB1, SOB2, and SOB3 can be integrated using the CT flag as shown in FIG. 18.

Step 2: The values of related search information in SOBI and cell information are restored to the values of the original search information. FIG. 19 illustrates a table showing search information related to SOBs before temporary deletion, after temporary deletion and after full restoration.

A method of updating search information in restoration of an SOB will now be explained.

Step 1: The arrival time of the first AP of SOB1 becomes the arrival time of the first AP of SOB_rec.

Step 2: The arrival time of the last AP of SOB3 becomes the arrival time of the last AP of SOB_rec.

Figure 20:
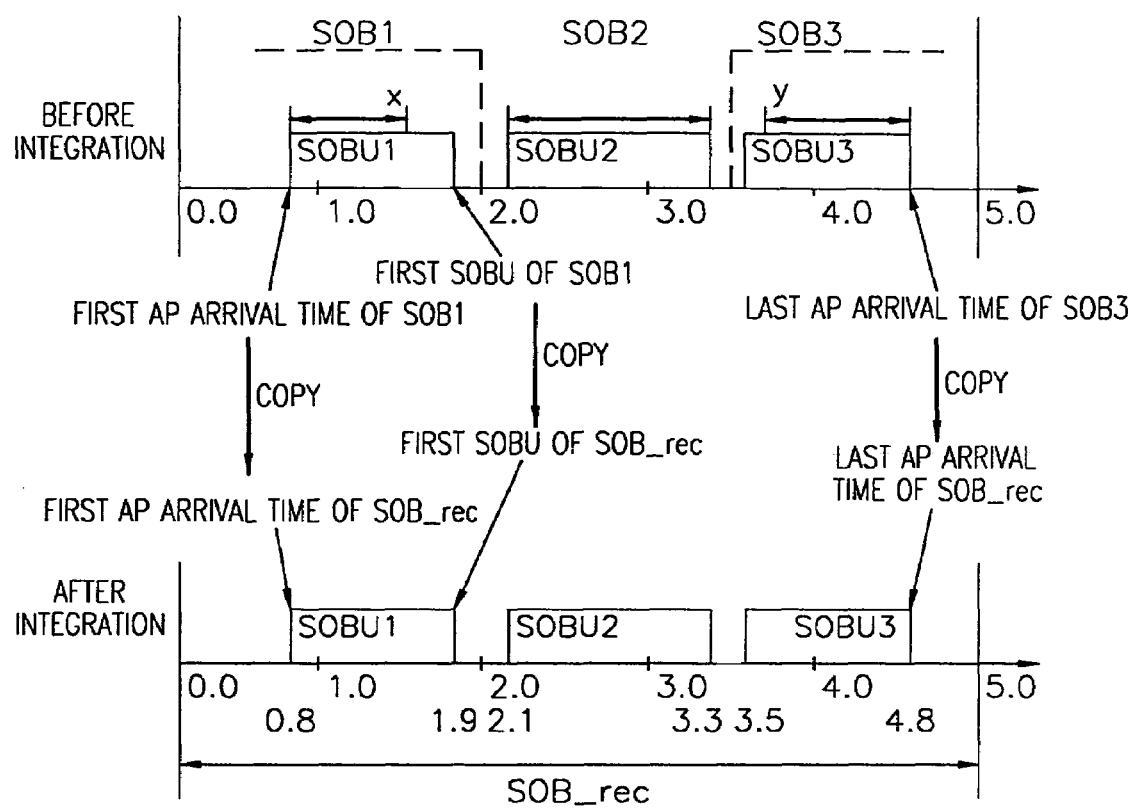
FIG. 20 illustrates an application packet (AP) arrival time of each SOB before integration and after integration.

Step 3: The first SOBU of SOB1 becomes the first SOBU of SOB_rec. When SOB1, SOB2, and SOB3 are integrated, the first SOBU of SOB1 becomes the first SOBU, and FIG. 20 explains the steps 1 through 3.

Step 4: The sum of the number of MAPL items of each of SOB1, SOB2, and SOB3 becomes the number of MAPL item of SOB_rec. Since each of SOB1, SOB2, and SOB3 has one SOBU in the embodiment of the present invention, shown in FIG. 16, when SOB1, SOB2 and SOB3 are integrated, the number of SOBUs is the sum of SOBUs the SOBs have.

Step 5: The IAPAT of SOB_rec is modified. This step will be explained, referring to FIGS. 21 through 25.

Figure 21:
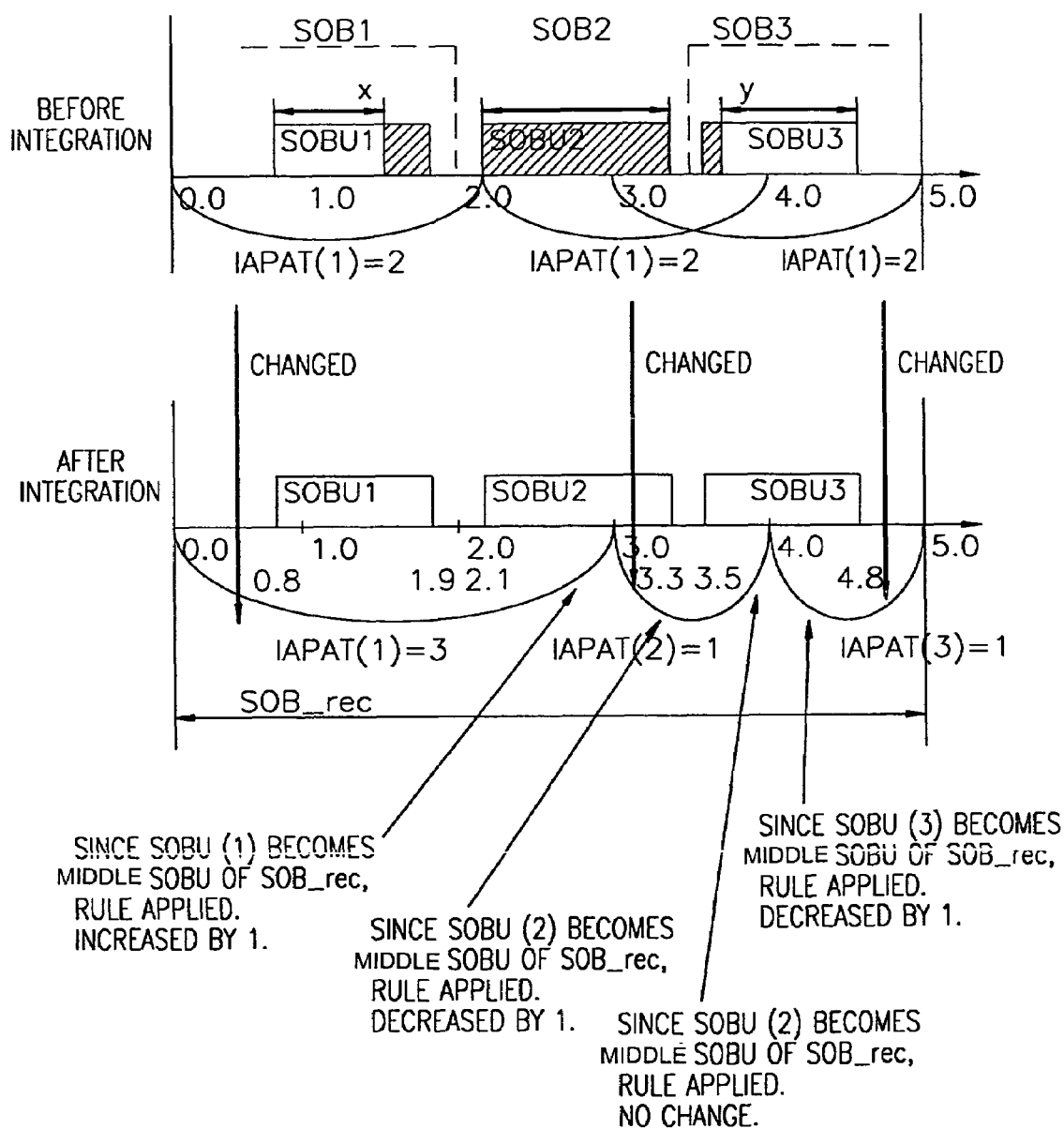
FIG. 21 illustrates relationships among stream objects before and after integration, and corresponding mapping lists (MPALs), and IAPATs.

FIG. 21 illustrates SOBs before and after integration and the IAPATs and MAPLs corresponding to respective SOBs. The IAPATs have different values depending on the locations of corresponding SOBUs. This is because the definition of IAPATs is different depending on the locations of the SOBUs.

Before integration, SOBU1 is the last SOBU of SOB1, and SOBU2 is the first SOBU of SOB2. In addition, SOBU2 is the last SOBU of SOB2, and SOBU3 is the first SOBU of SOB3. Therefore, the IAPAT of SOBU1 is 3.0 incremented by 1.0, the IAPAT of SOBU2 is 1.0 decremented by 1.0 and the IAPAT of SOBU3 is 1.0 decremented by 1.0.

First, the last IAPAT of SOB1, the first and last IAPATs of SOB2, and the first IAPAT of SOB3 are modified. In FIG. 21, since SOB2 is formed by one SOBU, the first SOBU and the last SOBU of SOB2 are the same.

After integration, on the boundary between SOB1 and SOB2, the IAPAT related to SOBU1, the last SOBU of SOB1, and the IAPAT related to SOBU2, the first SOBU of SOB2, change in the relative locations inside the SOB. Therefore, the values must be modified.

Figure 22A:
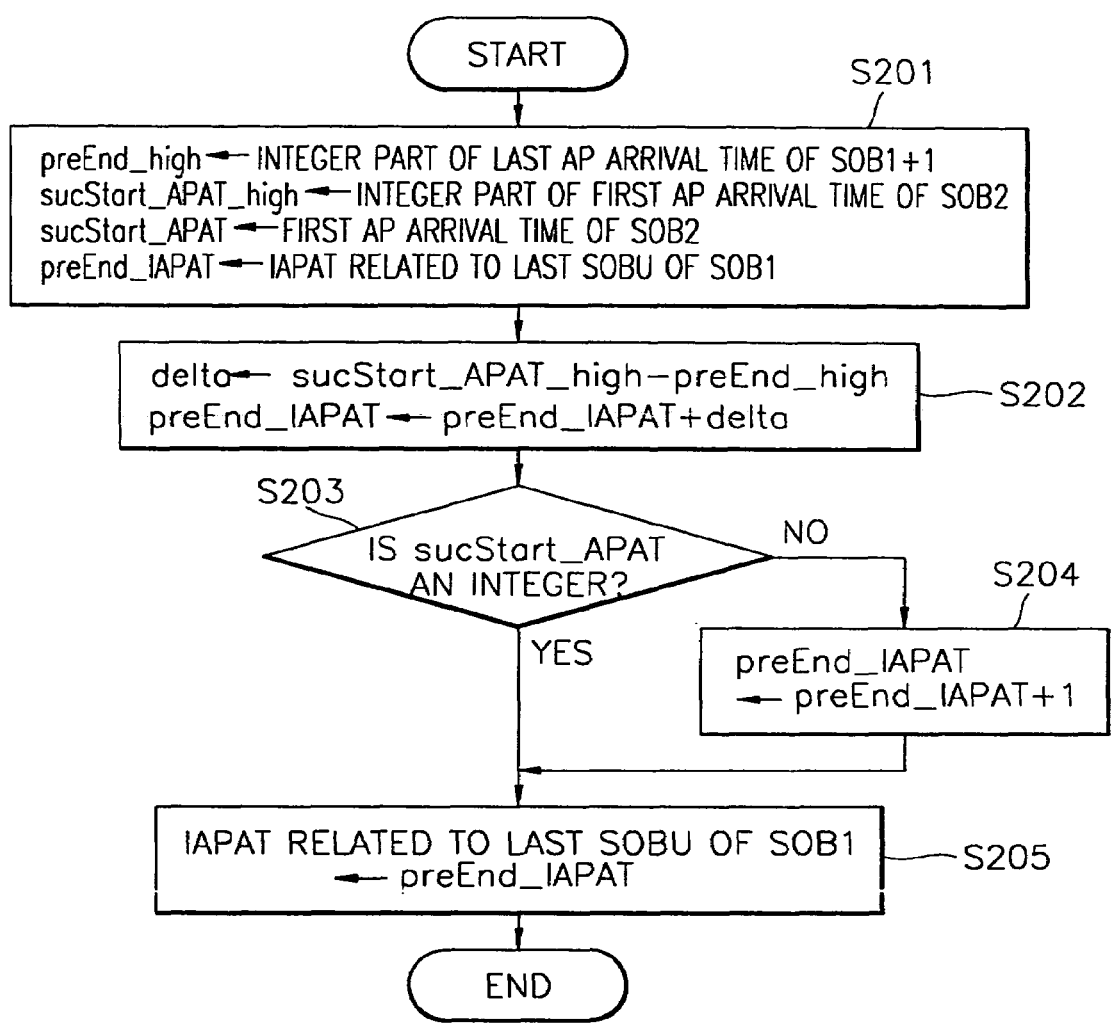
FIGS. 22A and 22B illustrate flowcharts showing an IAPAT modification method related to a last stream object unit of a preceding stream object when integrating stream objects.

First, the flowchart for showing a method of modifying the IAPAT of SOBU1, the last SOBU of SOB1, is shown in FIG. 22A. First, in step S201, the integer part of the arrival time of the last AP of SOBU1, the last SOBU of SOB1, is incremented by 1, and then stored in a variable named preEnd_high (=2); the arrival time of the first AP of SOB2 is stored in a variable named sucStart_APAT (=2.1); the integer part of the arrival time of the first AP of SOB2 is stored in sucStart_APAT_high (=2.0); and the IAPAT of SOBU1, the last SOBU of SOB1, is stored in a variable named preEnd_IAPAT (=2). After obtaining the difference (delta=0) between the sucStart_APAT_high and preEnd_high, the difference (delta) is added to preEnd_IAPAT(=2) in step S202. It is determined in step S203 whether or not sucStart_APAT is an integer. When sucStart_APAT is not an integer, preEnd_IAPAT (=2) is modified by being incremented by 1 in step S204. The modified preEnd_IAPAT (=3) is stored as the IAPAT of the last SOBU of SOB1, or when sucStart_APAT is an integer in the step S203, preEnd_IAPAT (=2), which is obtained in the step S202, is stored as the IAPAT of the last SOBU of SOB1 without modification in step S205. Therefore, the IAPAT of SOBU1 is 3.

Figure 23A:
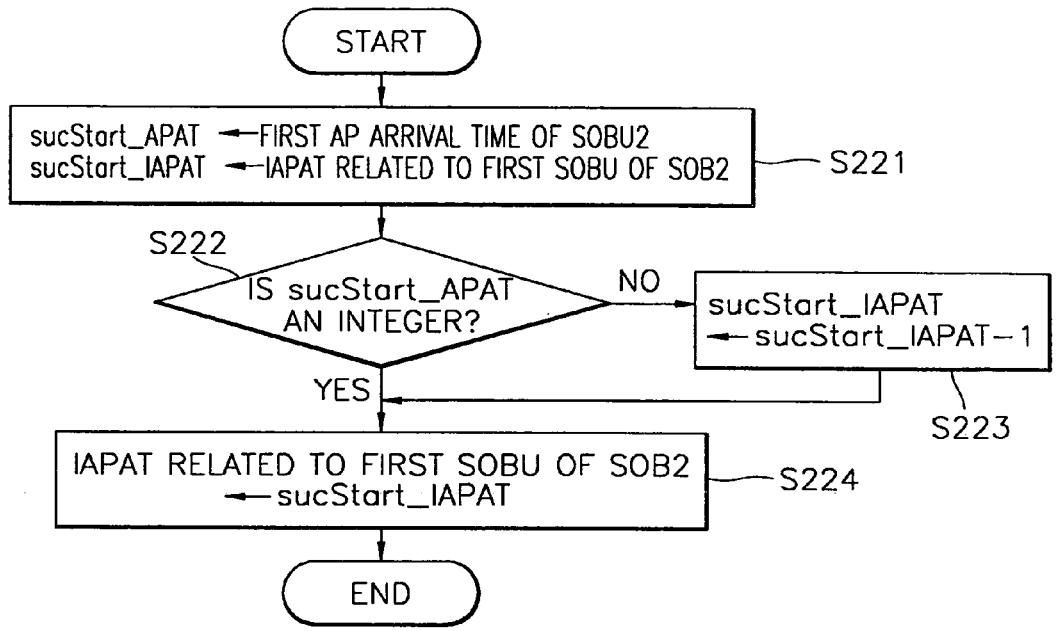
FIGS. 23A and 23B illustrate flowcharts showing an IAPAT modification method related to a first stream object unit of a following stream object when integrating stream objects.

Next, the flowchart for showing a method of modifying the IAPAT of SOBU2, the first SOBU of SOB2 after integration, is shown in FIG. 23A. First, in step S221, the arrival time of the first AP of SOBU2, the first SOBU of SOB2, is stored in a variable named sucStart_APAT (=2.1), and the IAPAT of SOBU2, the first SOBU of SOB2, is stored in a variable named sucStart_IAPAT (=2). It is determined whether or not sucStart_APAT is an integer in step S222. When sucStart_APAT is not an integer, sucStart_IAPAT (=2) is modified by being decreased by 1 in step S223. The modified sucStart_IAPAT (=1) is stored as the IAPAT of SOBU2, or when sucStart_APAT is an integer in the step S222, sucStart_IAPAT (=2), which is set in the step S221, is stored as the IAPAT of the first SOBU of SOB2 without modification in step S224. Therefore, the IAPAT of SOBU2 is 1.

Figure 24:
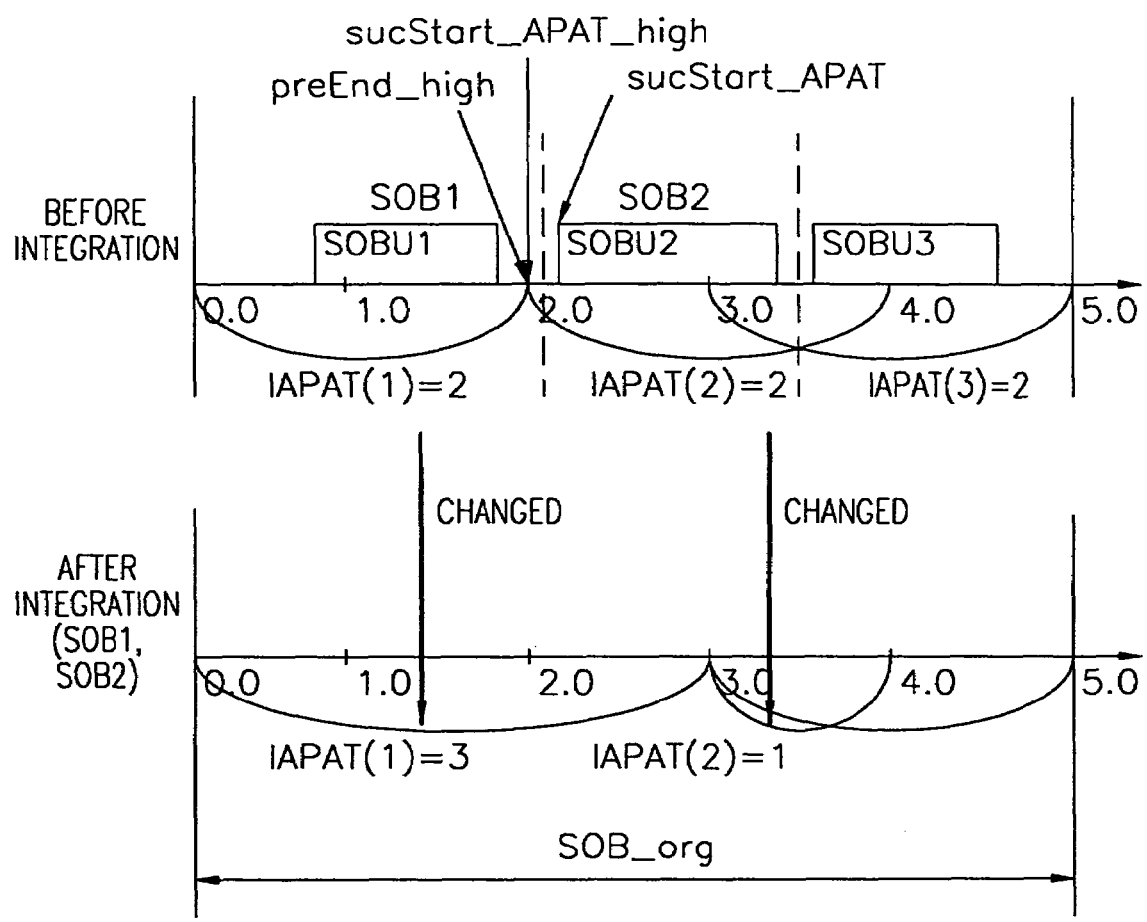
FIG. 24 illustrates values indicated by variables used in the flowcharts of FIGS. 22A and 23A, when SOB1 and SOB2 are integrated into an SOB.

FIG. 24 illustrates the values indicated by the variables used in the flowcharts of FIGS. 22A and 23A when SOB1 and SOB2 are integrated into an SOB.

Likewise, after integration, on the boundary between SOB2 and SOB3, the relative locations of the IAPAT related to SOBU2, of the last SOBU of SOB2, and of the IAPAT related to SOBU3, the first SOBU of SOB3, change inside the SOB. Therefore, the values must be modified.

Figure 22B:
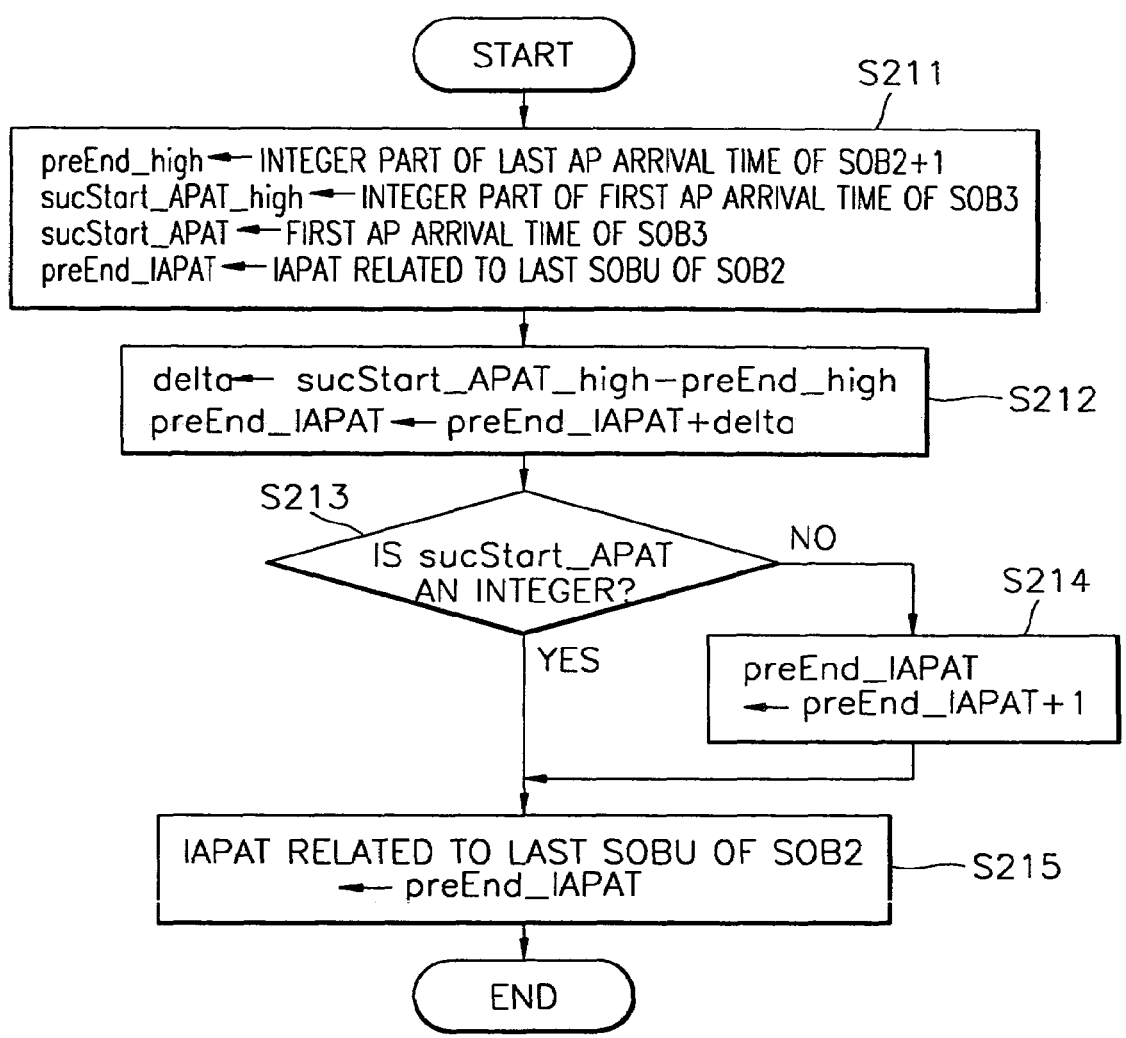

First, the flowchart for showing a method for modifying the IAPAT of SOBU2, the last SOBU of SOB2, is shown in FIG. 22B. First, in step S211, the integer part of the arrival time of the last AP of SOBU2, the last SOBU of SOB2, is incremented by 1, and then stored in a variable named preEnd_high (=4); the arrival time of the first AP of SOB3 is stored in a variable named sucStart_APAT (=3.5); the integer part of the arrival time of the first AP of SOB3 is stored in sucStart_APAT high (=3.0); the IAPAT of SOBU2, the last SOBU of SOB2, is stored in a variable named preEnd_IAPAT (=1). After obtaining the difference (delta=−1) between the sucStart_APAT_high and preEnd_high, the difference (delta) is added to preEnd_IAPAT (=1) in step S212. It is determined in step S213 whether or not sucStart_ APAT is an integer. When sucStart_APAT is not an integer, preEnd_IAPAT(=1) is modified by being incremented by 1 in step S214. The modified preEnd_IAPAT is stored as the IAPAT of the last SOBU of SOB2, or when sucStart_APAT is an integer in the step S213, preEnd_IAPAT (=0), which is set in the step S212, is stored as the IAPAT of the last SOBU of SOB2 without modification in step S215. Therefore, the IAPAT of SOBU1 is 1.

Figure 23B:
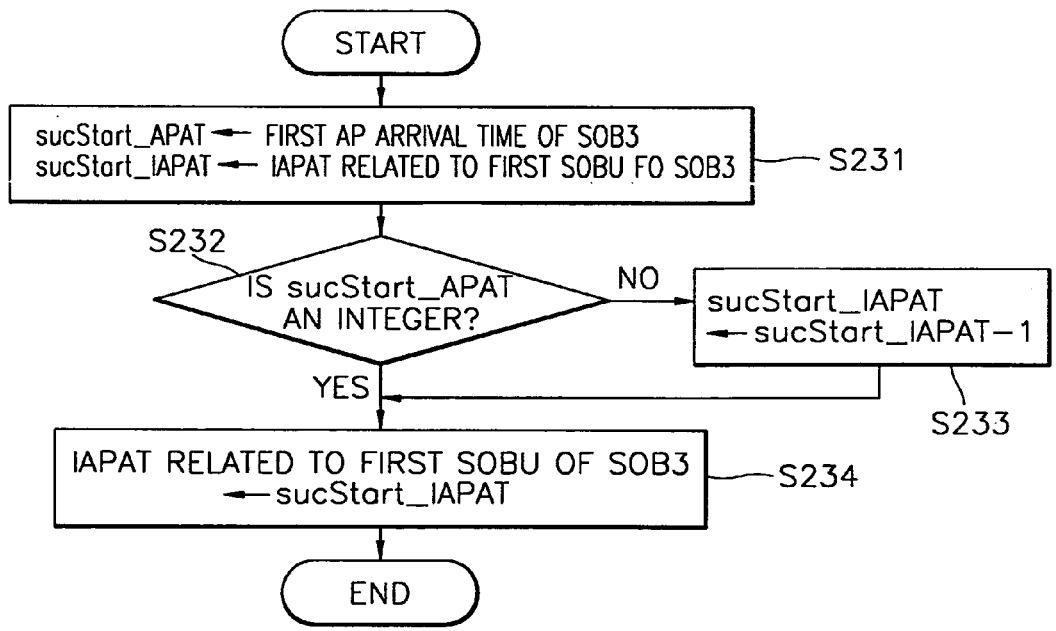

Next, the flowchart for showing a method of modifying the IAPAT of SOBU3 is shown in FIG. 23B. First, the arrival time of the first AP of SOBU3, the first SOBU of SOB3, is stored in a variable named sucStart_APAT (=3.5), and the IAPAT of SOBU3, the first SOBU of SOB3 is stored in sucStart_IAPAT (=3) in step S231. It is determined in step S232 whether or not sucStart_APAT is an integer. When sucStart_APAT is not an integer, sucStart_IAPAT (=2) is modified by being decreased by 1 in step S233. The modified sucStart_IAPAT (=1) is stored as the IAPAT of SOBU3, or when sucStart_APAT is an integer in the step S232, sucStart_IAPAT (=2), which is set in the step S231, is stored as the IAPAT of SOBU3 without modification in step S234. Therefore, the IAPAT of SOBU3 is 1.

Figure 25:
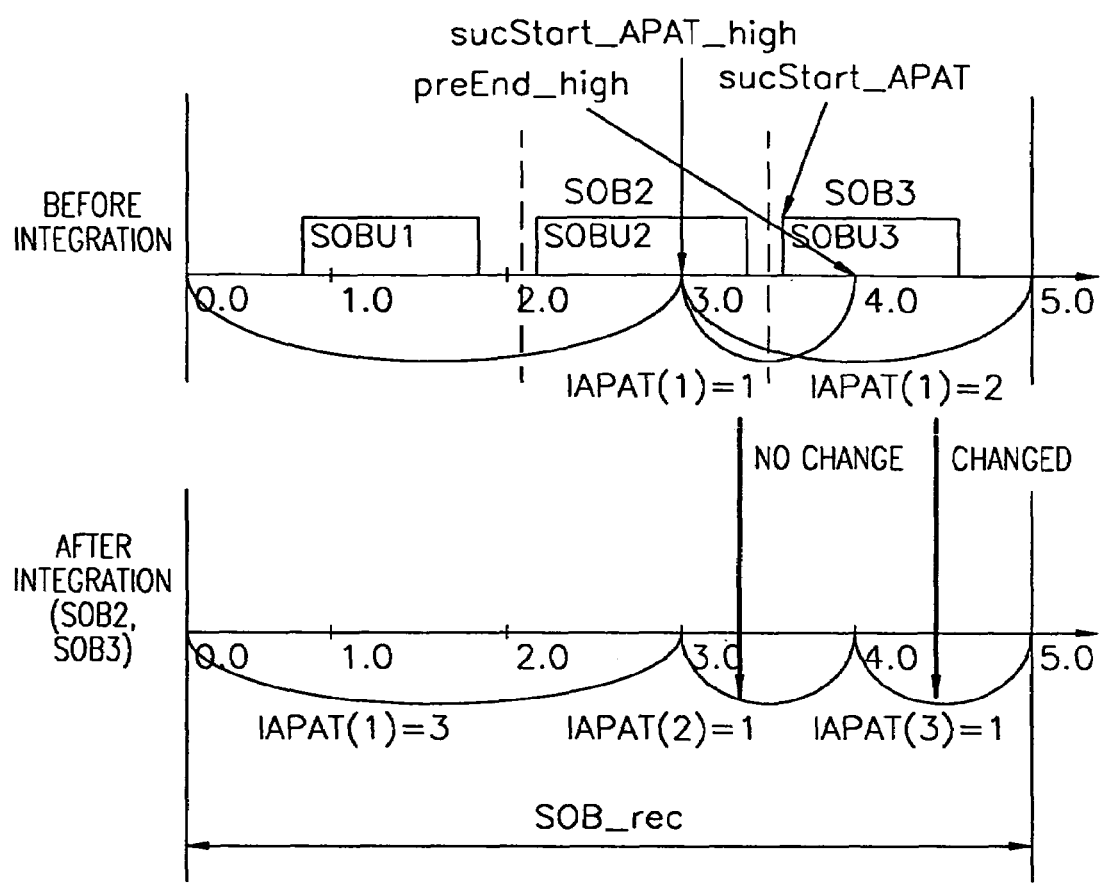
FIG. 25 illustrates the value indicated by the variables used in the flowcharts of FIGS. 22B and 23B, when SOB2 and SOB3 are integrated into the SOB.

FIG. 25 illustrates the values indicated by the variables used in the flowcharts of FIGS. 22B and 23B, when SOB2 and SOB3 are integrated into an SOB.

Step 6: The status of SOB_rec is determined. Since the SOB is fully restored, the TE flag and the CT flag of SOB_rec are reset.

Step 7: The arrival time of the first AP of a corresponding cell in SOB1 becomes the arrival time of the first AP of a corresponding cell in SOB_rec.

Step 8: The arrival time of the last AP of a corresponding cell in SOB3 becomes the arrival time of the last AP of a corresponding cell in SOB_rec.

Figure 26:
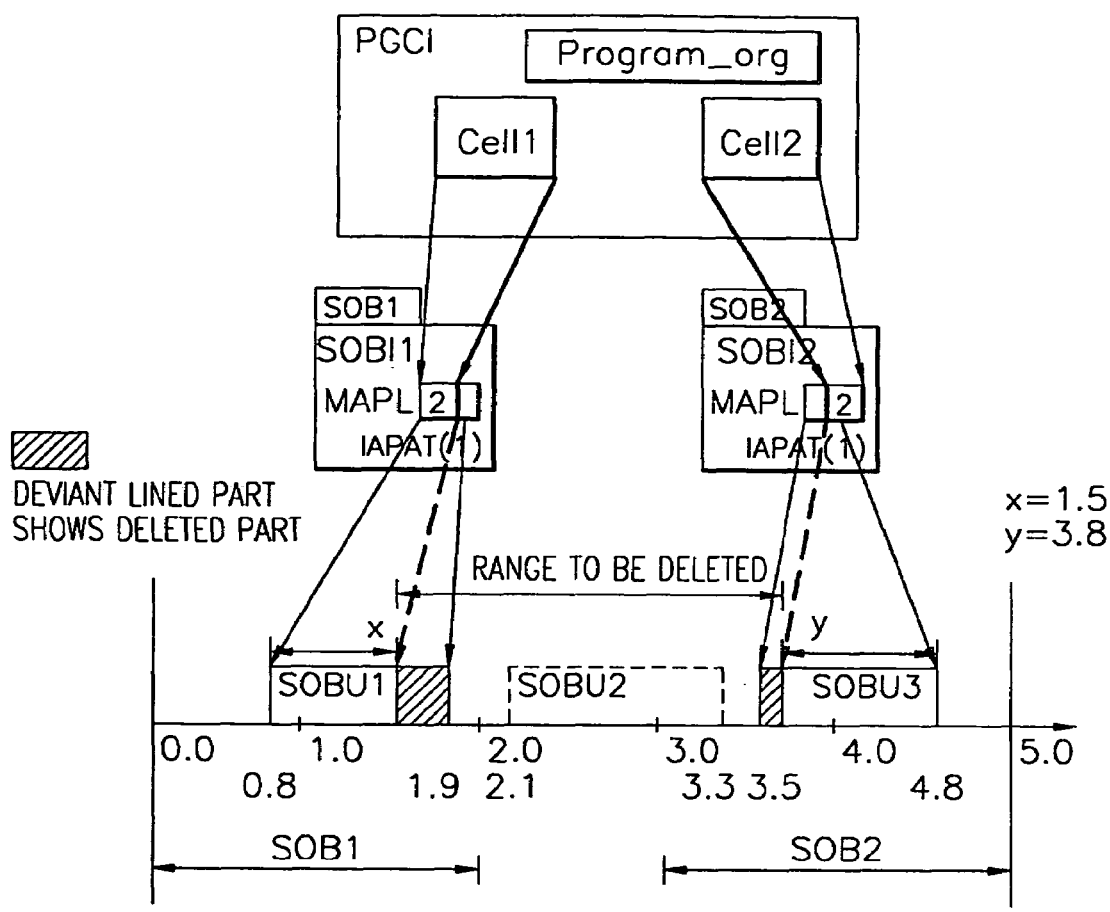
FIG. 26 illustrates an example of permanent deletion of a part of a program.

FIG. 26 illustrates an example of permanent deletion of the range from x to y in an SOB. Here, the SOBU which is permanently deleted is SOBU2. In permanent deletion, link information as well as search information must be changed. Therefore, in permanent deletion of the range from x to y, since SOBU1 is the last SOBU of the newly-generated SOB by division, the corresponding IAPAT must be changed, and since SOBU3 is the first SOBU of the newly-generated SOB by division, the corresponding IAPAT must be changed. In addition, search information of SOBU2, the SOBU located between x and y that can be fully deleted, must be deleted. Link information related to SOBU2 must be deleted, too. For reference, when only a part of an SOBU is deleted, related search information is kept.

When search information and link information related to SOBU2 is fully deleted like this, search information and link information of Program_org as shown in FIG. 26 are updated as search information of Cell 1 and Cell 2.

Figure 27:
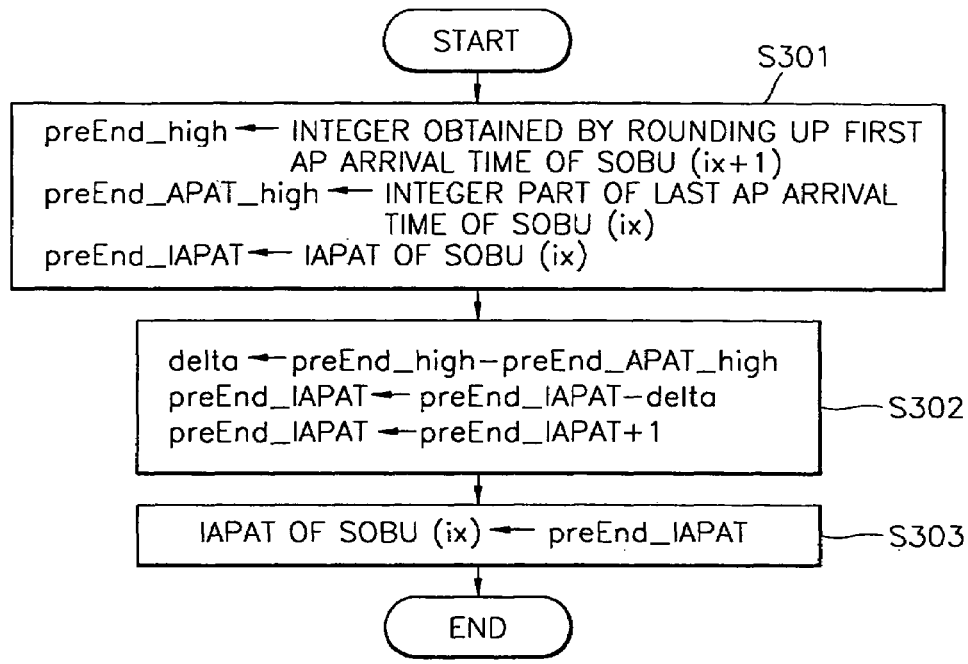
FIG. 27 illustrates an IAPAT modification method related to a last stream object unit of a preceding stream object when dividing a stream object by permanent deletion according to the present invention.

FIG. 27 illustrates a flowchart for showing a method of modifying the IAPAT related to the last SOBU of the preceding SOB (corresponding to Cell 1 of FIG. 26), when dividing an SOB by permanent deletion according to the present invention. After the division of an SOB by permanent deletion, since on the boundary between SOB1 and SOB2, the relative location of SOBU(ix=1), the last SOBU of SOB1, changes inside the SOB, the value must be modified. It is assumed that the arrival time of the last AP of SOBU(ix), the arrival time of the first AP of SOBU(ix+1), the arrival time of the last AP of SOBU(iy−1), and the arrival time of the first AP of SOBU(iy) are known already.

First, in step S301, the arrival time of the first AP of SOBU(ix+1=2), the first SOBU of SOB2, is rounded up to an integer value and stored in a variable named preEnd_high (=3); the integer part of the arrival time of the last AP of SOBU(ix=1), the last SOBU of SOB1, is stored in a variable named preEnd_APAT_high (=1); and the IAPAT of SOBU (ix), the last SOBU of SOB1, is stored in a variable named preEnd_IAPAT (=3). In step S302, the difference (delta=2) between preEnd_high and preEnd_APAT_high is obtained; the difference (delta=2) is subtracted from preEnd_IAPAT (=3); and then preEnd_IAPAT is modified by increasing the result of the subtraction by 1. In step S303, the modified preEnd_IAPAT (=2) is stored as the IAPAT of SOBU(ix). Therefore, the IAPAT of SOBU(ix=1) is 2.

Figure 28:
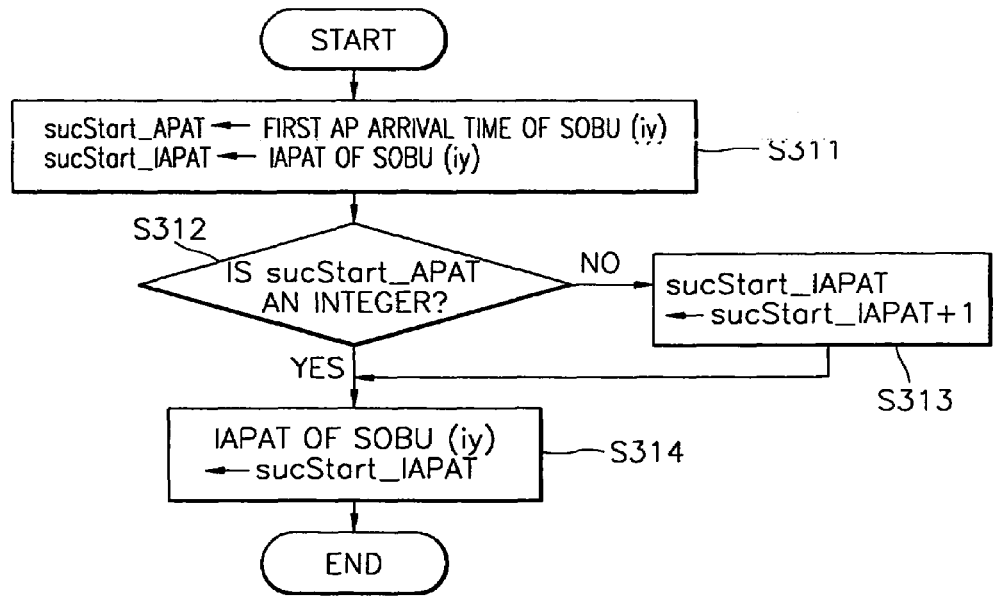
FIG. 28 illustrates an IAPAT modification method related to a first stream object unit of a following stream object when dividing a stream object by permanent deletion according to the present invention.

FIG. 28 illustrates a flowchart for showing a method of modifying the IAPAT related to the first SOBU of the following SOB (corresponding to Cell 2 of FIG. 26), when dividing an SOB by permanent deletion according to the present invention. Since the relative location of the IAPAT related to SOBU(iy=3), the first SOBU of SOB2, changes inside an SOB, the value must be modifield.

First, the arrival time of the first AP of SOBU(iy=3), the first SOBU of SOB2, is stored in a variable named sucStart_APAT (=3.5), and the IAPAT of SOBU(iy), the first SOBU of SOB2, is stored in a variable named sucStart_IAPAT (=1) in step S311. It is determined whether or not sucStart_APAT is an integer in step S312. When sucStart_APAT is not an integer, sucStart_IAPAT (=1) is modified by being incremented by 1 in step S313. The modified sucStart_IAPAT (=2) is stored as the IAPAT of SOBU(iy), or when sucStart_ APAT is an integer in the step S312, sucStart_IAPAT (=1), which is set in the step S311, is stored as the IAPAT of SOBU(iy) without change in step S314. Therefore, the IAPAT of SOBU(iy=3) is 2.

The present invention can be used in a recording/reproducing device using digital recording media, and, in particular, it can be effectively used in a stream recorder.

According to the present invention, a method of generating search information, which has not been suggested in the previous art, in which an SOB is divided by temporary deletion is provided. When the information structure and restoration method according to the present invention are used, SOBs divided by temporary deletion are fully restored to their original state.

In addition, in a process for searching an SOB including desired data, the integer part of the arrival time of the first data of the SOB is set as the initial value, instead of setting the initial value at "0", which enables high speed searching.

Also, since in permanently deleting a part which is temporarily deleted, the range to be deleted can be found using only search information, it is appropriate for such applications that need fast deletion.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of searching a plurality of stream objects, comprising:

storing on a recording medium stream objects and search information for searching a plurality of the stream objects, each of which has additional information on an arrival time of packet data, and link information for linking the search information to the stream objects;

setting an arrival time of a location a user wants to search, and setting an integer part of the arrival time of a first packet of one of the stream objects included in the location, as an initial value of an accumulated value;

generating the accumulated value by accumulating an incremental packet arrival time of a first stream object unit within the one stream object to the initial value; and repeatedly performing the generating of the accumulated value so as to accumulate an incremental packet arrival time of a next stream object unit to the initial value until the arrival time set for the location that the user wants to search is less than or equal to the accumulated value.

* * * * *